United States Patent
Yasui et al.

(10) Patent No.: US 9,505,385 B2
(45) Date of Patent: Nov. 29, 2016

(54) ELECTRIC BRAKING SYSTEM FOR VEHICLE

(71) Applicants: Yoshiyuki Yasui, Nagoya (JP); Hiroyuki Kodama, Kariya (JP); Naotoshi Satake, Nagoya (JP)

(72) Inventors: Yoshiyuki Yasui, Nagoya (JP); Hiroyuki Kodama, Kariya (JP); Naotoshi Satake, Nagoya (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/776,110

(22) PCT Filed: Mar. 17, 2014

(86) PCT No.: PCT/JP2014/057144
§ 371 (c)(1),
(2) Date: Sep. 14, 2015

(87) PCT Pub. No.: WO2014/142336
PCT Pub. Date: Sep. 18, 2014

(65) Prior Publication Data
US 2016/0001752 A1   Jan. 7, 2016

(30) Foreign Application Priority Data

Mar. 15, 2013  (JP) ................................. 2013-052735
Mar. 15, 2013  (JP) ................................. 2013-052736

(51) Int. Cl.
*B60T 8/172* (2006.01)
*B60T 13/74* (2006.01)
(Continued)

(52) U.S. Cl.
CPC .............. *B60T 8/172* (2013.01); *B60T 13/741* (2013.01); *F16D 55/225* (2013.01); *B60T 8/3255* (2013.01)

(58) Field of Classification Search
CPC .... B60T 8/172; B60T 8/3255; B60T 13/741; F16D 55/225
USPC ........................................................ 701/70
See application file for complete search history.

(56) References Cited

U.S. PATENT DOCUMENTS

2011/0106381 A1*  5/2011  Filev ..................... B62D 6/007
                                                       701/40
2014/0159476 A1*  6/2014  Griffin ...................... B60T 7/12
                                                       303/186
(Continued)

FOREIGN PATENT DOCUMENTS

JP  2000-018294 A  1/2000
JP  2000-213575 A  8/2000
(Continued)

OTHER PUBLICATIONS

International Search Report (PCT/ISA/210) mailed on Jun. 17, 2014, by the Japanese Patent Office as the International Searching Authority for International Application No. PCT/JP2014/057144.

*Primary Examiner* — McDieunel Marc
*Assistant Examiner* — James E Stroud
(74) *Attorney, Agent, or Firm* — Buchanan Ingersoll & Rooney PC

(57) ABSTRACT

When a braking operation amount is reduced, a stiffness value representing a ratio of variation in actual pressing force of a friction member to a variation in actual position of an electric motor are sequentially computed. The actual position when the stiffness value changes from being higher than or equal to a predetermined value to being lower than the predetermined value is stored as a candidate position. When a duration during which the stiffness value is lower than the predetermined value is shorter than a clearance corresponding value corresponding to a transmission member clearance in a state where the candidate position is stored, the candidate position is deleted. When the duration during which the stiffness value is lower than the predetermined value exceeds the clearance corresponding value, the stored candidate position is determined as a reference position at which the friction member and the rotary member begin contacting each other.

4 Claims, 14 Drawing Sheets

(51) Int. Cl.
*F16D 55/225* (2006.01)
*B60T 8/32* (2006.01)

(56) References Cited

U.S. PATENT DOCUMENTS

| | | | |
|---|---|---|---|
| 2015/0081186 A1* | 3/2015 | Yasui | B60T 8/173 701/70 |
| 2015/0112565 A1* | 4/2015 | Yasui | B60T 8/171 701/70 |
| 2015/0151727 A1* | 6/2015 | Yasui | B60T 13/741 701/70 |
| 2015/0239442 A1* | 8/2015 | Yamakado | B60L 3/102 701/70 |
| 2015/0291038 A1* | 10/2015 | Akiyama | B60L 3/102 701/22 |
| 2015/0314686 A1* | 11/2015 | Knechtges | B60T 1/10 303/3 |
| 2016/0031427 A1* | 2/2016 | Yasui | B60T 17/22 701/70 |

FOREIGN PATENT DOCUMENTS

| | | |
|---|---|---|
| JP | 2001-225741 A | 8/2001 |
| JP | 2003-205837 A | 7/2003 |
| JP | 2004-124950 A | 4/2004 |

* cited by examiner (a) SCHEMATIC VIEW OF OLDHAM COUPLING (b) CROSS-SECTIONAL VIEW OF POWER TRANSMITTING PORTION (FITTED PORTION BETWEEN PROTRUSION OF HBM AND RECESS OF SLD)

F I G . 11
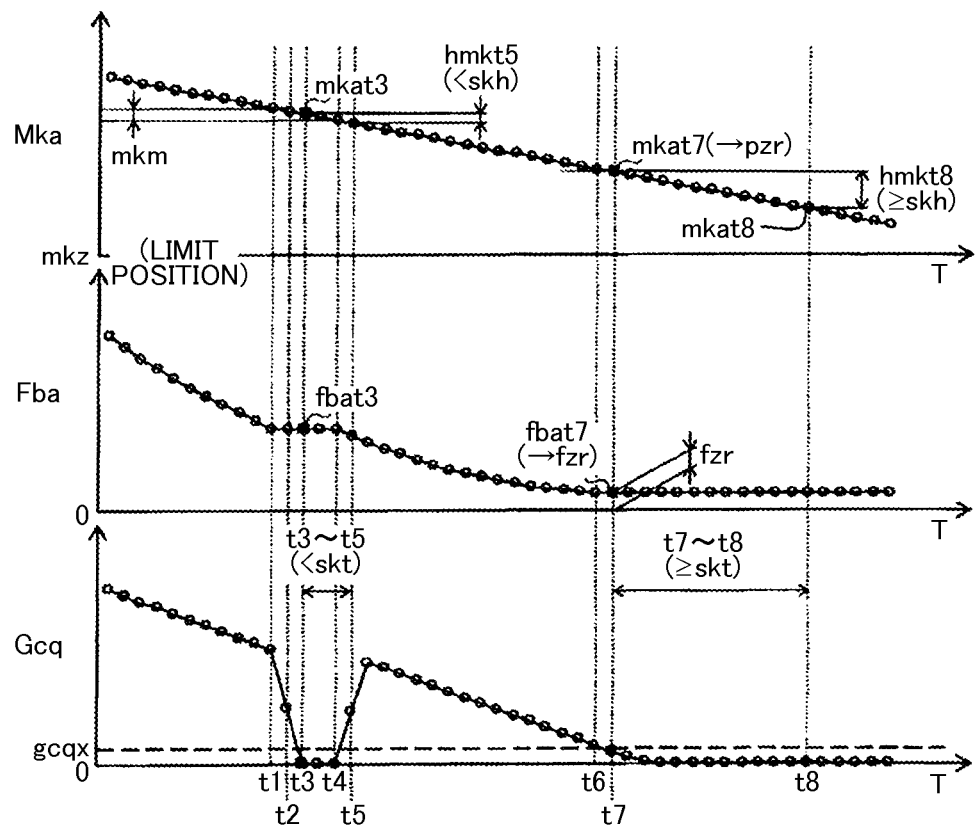

F I G . 12
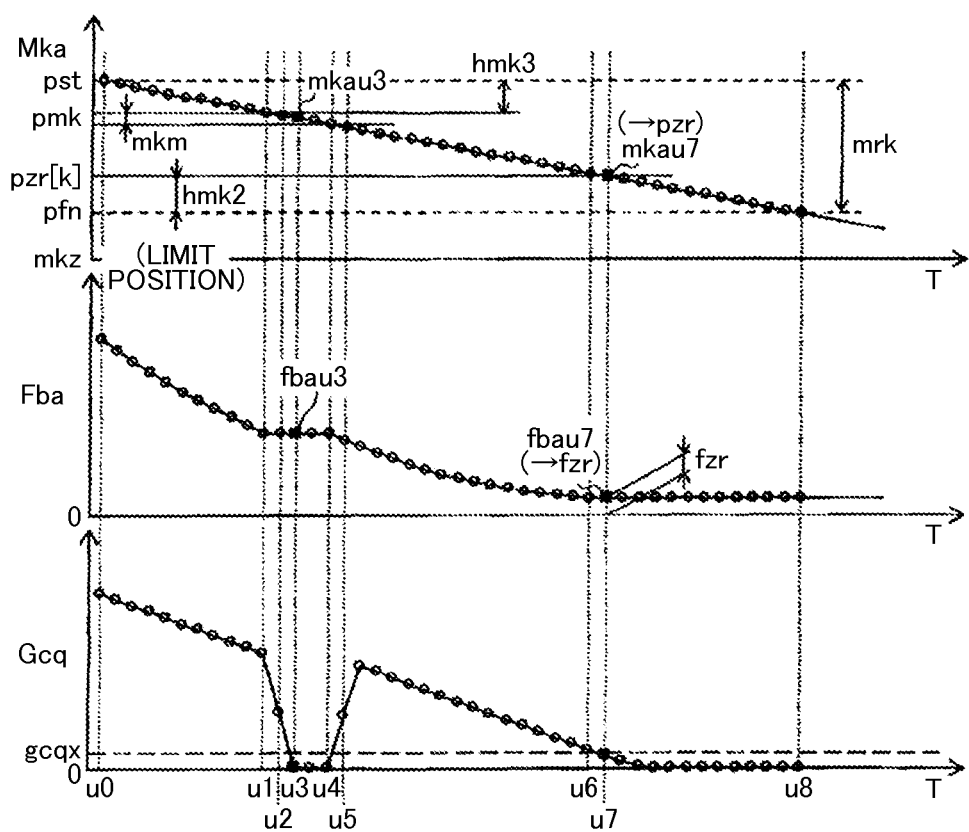

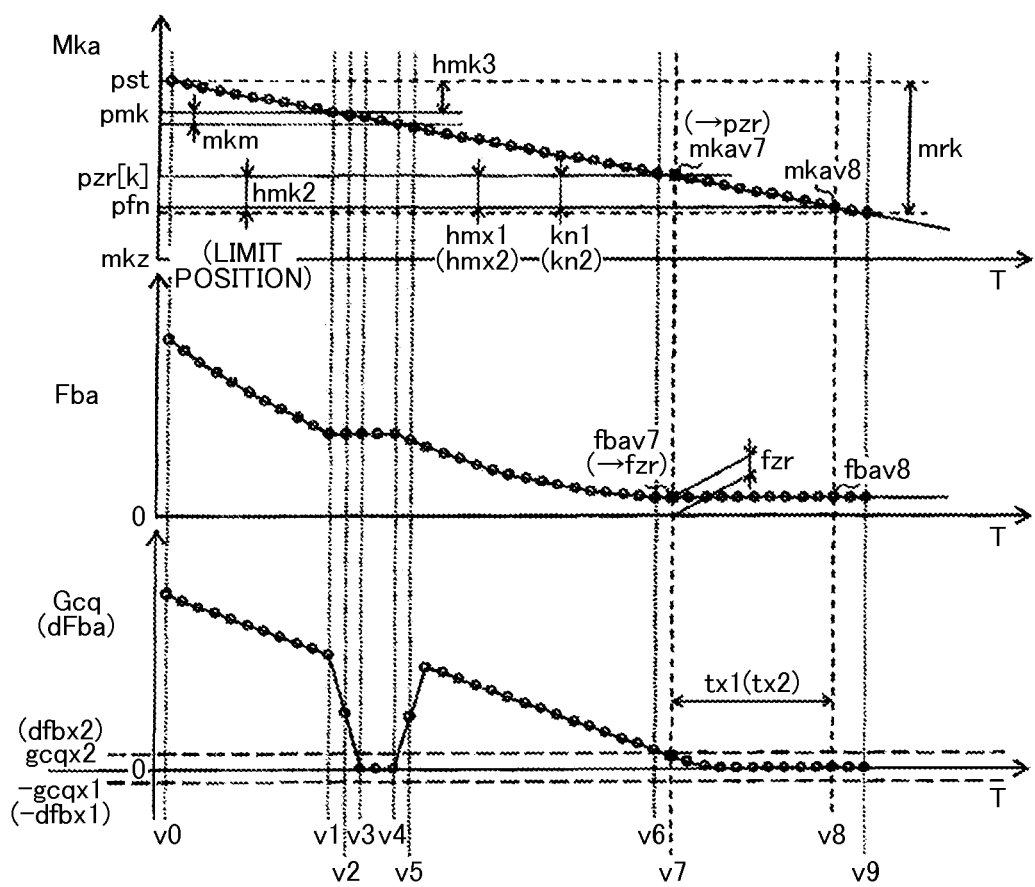
F I G . 13

ELECTRIC BRAKING SYSTEM FOR VEHICLE

TECHNICAL FIELD

The invention relates to an electric braking system for a vehicle.

BACKGROUND ART

For the purpose of accurately obtaining a reference position at which a brake disc (also referred to as brake rotor) and a brake pad begin to contact with each other, the following is described in an existing art.

In Patent Document 1, it is described that an electric drive braking system includes a differentiating circuit for an output of a press sensor and a circuit that compares a differential value with a set threshold and then sets an origin point (reference position) to a position at which the differential value of the output of the press sensor becomes lower than the set threshold.

In Patent Document 2, it is described that, in an electric brake, when a pressing force that is applied to a brake pad is reduced, the rotation position of an electric motor at the time when the gradient of reduction in pressing force (a variation in pressing force to a variation in rotation angle) becomes gentler than a set gradient, is set for a temporary zero-point position, and a position shifted to the back side from the temporary zero-point position by an amount α corresponding to a non-reset amount of the brake pad is set to a zero-point position (reference position).

In Patent Document 3, it is described that, at the time of releasing a brake, a position at which a piston is returned from a piston position at the time when a piston thrust becomes smaller than or equal to a predetermined threshold larger than zero to a brake releasing side by a predetermined amount is set for a contact start position (reference position) at which a disc rotor and a brake pad begin to contact with each other.

RELATED ART DOCUMENT

Patent Document

Patent Document 1: Japanese Patent Application Publication No. 2000-018294 (JP 2000-018294 A)
Patent Document 2: Japanese Patent Application Publication No. 2001-225741 (JP 2001-225741 A)
Patent Document 3: Japanese Patent Application Publication No. 2004-124950 (JP 2004-124950 A)

SUMMARY OF THE INVENTION

In an electro-mechanical braking system (so-called electric brake, and called EMB (electro-mechanical brake)), the power of an electric motor is transmitted to a friction member (for example, a brake pad) by a power transmission mechanism, such as a speed reducer, and a force (pressing force) that presses the friction member against a rotary member (for example, a brake disc) is generated. Generally, a reference position is detected when a braking torque is reduced by rotating the electric motor in the reverse direction (that is, when the friction member gradually separates from the rotary member and a force that the friction member presses the rotary member is reduced). The reference position is a boundary position between a side in which the friction member and the rotary member contact with each other and a side in which the friction member and the rotary member do not contact with each other, and is also called contact start position, zero-point position or initial position.

Hereinafter, the relationship among a reference position, a position (rotation angle) Mka of the electric motor and a pressing force Fba in the case where the pressing force is reduced by rotating the electric motor in the reverse direction will be described with reference to FIG. 14. When the pressing force Fba is reduced, a contact state in transmission of power switches (for example, when a gear speed reducer is employed, contacting tooth flanks switch) because of rattles of mechanical elements (a backlash of the speed reducer, clearances in a coupling, and the like) of the power transmission mechanism. As a result of switching of the contact state, there may occur a state that the rotation angle Mka of the electric motor changes but the pressing force Fba does not change. That is, an ineffective displacement (ineffective rotation angle) arises in the rotation angle Mka of the electric motor over a displacement mkm because of the rattles (clearances) of the mechanical elements. A position (the rotation angle of the electric motor) at which the ineffective displacement arises changes with the abrasion of the friction member. In addition, the width of the ineffective displacement (the size of mkm) also changes with the abrasion (an increase in the clearances) of the mechanical elements. The pressing force Fba is detected by detecting means (sensor), and the detected value includes an error. For example, a detection error is a drift (offset) of a zero point, and is an error in the ordinate-axis direction (an error of a value fbd at the zero point of Fba) as shown in FIG. 14.

As described in Patent Document 1 to Patent Document 3, when the reference position is determined on the basis of the differential value (rate of change) of the output of the press sensor (Patent Document 1), the gradient of reduction in pressing force (Patent Document 2) or the piston position at the time when the piston thrust becomes smaller than or equal to the predetermined threshold (Patent Document 3), the reference position may include an error because of the above-described ineffective displacement. In addition, in the method described in Patent Document 3, a zero-point drift, or the like, of pressing force detecting means (pressing force sensor) may also influence the accuracy of determining the reference position.

Generally, when the reference position is determined on the basis of the rate of change (differential value) or the gradient of reduction (dF/ds) in the pressing force Fba, the condition of the rate of change or the gradient of reduction is satisfied at a position mk1 at which the value of Fba is constant, and the reference position is determined on the basis of the position mk1. As a result, there may be a deviation between the computed reference position and a true zero-point position (a true value of the reference position) mk0. When the reference position is determined on the basis of a threshold of the output value Fba of the pressing force sensor, the reference position is determined on the basis of a position at the time when the pressing force Fba becomes smaller than or equal to a predetermined value. However, in addition to the above-described influence of the ineffective displacement mkm, the influence of the zero-point drift fbd of the sensor arises. For this reason, a method of determining the reference position, which may compensate for the influences of the ineffective displacement, the detection error, and the like, is desired.

The invention is contemplated to address the above-described problem, and it is an object of the invention to provide an electric braking system that may accurately determine a reference position that is a position at which a friction member (for example, a brake pad) begins to contact with a rotary member (for example, a brake disc).

An electric braking system for a vehicle according to the invention includes braking operation amount acquisition means (BPA) for acquiring a driver's braking operation amount (Bpa) of a braking operation member (BP) of the vehicle, braking means (BRK) for generating a braking torque in a wheel (WHL) of the vehicle by transmitting power of an electric motor (MTR) via a transmission member (GSK, and the like) to press a friction member (MSB) against a rotary member (KTB) fixed to the wheel (WHL), and control means (CTL) for computing a target energization amount (Imt) on the basis of the braking operation amount (Bpa) and controlling the electric motor (MTR) on the basis of the target energization amount (Imt).

The system is characterized in that the system includes pressing force acquisition means (FBA) for acquiring an actual pressing force (Fba) that is a force that the friction member (MSB) actually presses the rotary member (KTB) and position acquisition means (MKA) for acquiring an actual position (Mka) of the electric motor (MTR), and the control means (CTL) is configured to, when the braking operation amount (Bpa) is reduced, sequentially compute a stiffness value (Gcq) that is a ratio (Fbh/Mkh) of a variation (Fbh) in the actual pressing force (Fba) to a variation (Mkh) in the actual position (Mka); store, as a candidate position (Mkk), the actual position (mkat3, mkat7) at time (t3, t7) at which the stiffness value (Gcq) changes from a state higher than or equal to a predetermined value (gcqx) to a state lower than the predetermined value (gcqx); when a duration of the state where the stiffness value (Gcq) is lower than the predetermined value (gcqx) is shorter than a clearance corresponding value (skh, skt) corresponding to clearances in the transmission member (GSK, and the like) in a state where the candidate position (Mkk) is stored, delete the candidate position (Mkk, mkat3), at time (t8) at which the duration of the state where the stiffness value (Gcq) is lower than the predetermined value (gcqx) exceeds the clearance corresponding value (skh, skt) in the state where the candidate position (Mkk) is stored, determine the stored candidate position (Mkk, mkat7) as a reference position (pzr) at which the friction member (MSB) and the rotary member (KTB) begin to contact with each other; and compute the target energization amount (Imt) on the basis of the reference position (pzr).

With the above configuration, the reference position is not immediately determined at time at which the stiffness value (which corresponds to the spring constant of the braking means) changes from the state higher than or equal to the predetermined value to the state lower than the predetermined value, but the reference position is not determined until this state (stiffness value<predetermined value) is continued over the clearance corresponding value (a displacement or a time corresponding to the clearances in the transmission member). Therefore, even when there is an ineffective displacement due to the clearances in the transmission member, such as the speed reducer, the reference position (the position at which the friction member begins to contact with the rotary member) can be accurately determined. Because the stiffness value is computed as the ratio of the pressing force variation to the position variation, the influence of an error of the acquisition means (particularly, the zero-point drift of the pressing force acquisition means) can be compensated. The clearances in the transmission member include, for example, a backlash of gears, clearances in a coupling, and clearances in bearings. In addition, these clearances may be increased by aged abrasion. Therefore, the clearance corresponding value may be set to a value (preset predetermined value) that takes the clearances in the power transmission member, including aged abrasion, into consideration.

The electric braking system for a vehicle according to the invention may be configured such that the actual pressing force (fbat3, fbat7) at time (t3, t7) at which the stiffness value (Gcq) changes from a state higher than or equal to a predetermined value (gcqx) to a state lower than the predetermined value (gcqx) is stored as a candidate force (Fkk); when a duration of the state where the stiffness value (Gcq) is lower than the predetermined value (gcqx) is shorter than a clearance corresponding value (skh, skt) corresponding to a clearance in the transmission member (GSK, and the like) in a state where the candidate force (Fkk) is stored, the candidate force (Fkk, fbat3) is deleted; at time (t8) at which the duration of the state where the stiffness value (Gcq) is lower than the predetermined value (gcqx) exceeds the clearance corresponding value (skh, skt) in the state where the candidate force (Fkk) is stored, the stored candidate force (Fkk, fbat7) is determined as a correction pressing force (fzr) corresponding to a zero-point drift of the pressing force acquisition means (FBA); and the target energization amount (Imt) is computed on the basis of the correction pressing force (fzr).

Generally, a force is detected by measuring the strain of a strain element. In this detection of the strain, a drift of a detected value may cause a problem. With the above configuration, a correction amount (correction pressing force) corresponding to the zero-point drift of the pressing force is determined on the basis of the actual pressing force in the above-described computation process in which the reference position is determined. Therefore, the zero-point drift of the pressing force acquisition means can be reliably compensated.

The system is characterized in that the system includes pressing force acquisition means (FBA) for acquiring an actual pressing force (Fba) that is a force that the friction member (MSB) actually presses the rotary member (KTB) and position acquisition means (MKA) for acquiring an actual position (Mka) of the electric motor (MTR), and the control means (CTL) is configured to, when the braking operation amount (Bpa) is reduced, sequentially store a position data group (Mka(t)) for the actual position (Mka) and a pressing force data group (Fba(t)) for the actual pressing force (Fba) while the actual position (Mka) is changing from a start position (pst) that is one of end points of a storage section (mrk), including an ineffective displacement section (mkm) in which the actual position (Mka) reduces but the actual pressing force (Fba) does not reduce, to an end position (pfn) that is the other one of the end points of the storage section (mrk); determine a reference position (pzr), at which the friction member (MSB) and the rotary member (KTB) begin to contact with each other, on the basis of the position data group (Mka(t)) and the pressing force data group (Fba(t)); and compute the target energization amount (Imt) on the basis of the reference position (pzr).

The system is characterized in that the system is configured such that a correction pressing force (fzr) corresponding to a zero-point drift of the pressing force acquisition means (FBA) is configured to be determined on the basis of the position data group (Mka(t)) and the pressing force data group (Fba(t)); and the target energization amount (Imt) is configured to be computed on the basis of the correction pressing force (fzr).

With the above configuration, when the braking operation amount is reduced, the start position and the end position are determined so as to include the ineffective displacement mkm and a zero point (a true value of the reference position) in the actual position (actual rotation angle) of the electric motor. From the start position to the end position, a position data group for the actual position of the electric motor and a pressing force data group for the actual pressing force are sequentially stored. The position data group and the pressing force data group are associated with each other at the corresponding times acquired (that is, the corresponding times stored). The reference position at which the friction member and the rotary member begin to contact with each other is determined on the basis of the position data group and the pressing force data group. That is, when the electric motor is rotated in the reverse direction, the position data and the pressing force data, including the ineffective displacement section and the zero point, are stored in time series, determination is made in an ex-post manner on the basis of these pieces of data, and the reference position and the correction pressing force (the zero-point drift of the pressing force acquisition means) are determined. Therefore, the influences of errors due to the ineffective displacement can be suppressed.

BRIEF DESCRIPTION OF THE DRAWINGS

FIG. 11 is a time chart for illustrating the operation and advantageous effect of the first embodiment.

FIG. 12 is a time chart for illustrating the operation and advantageous effect of the second embodiment.

FIG. 13 is a time chart for illustrating the operations and advantageous effects of the third and fourth embodiments.

MODES FOR CARRYING OUT THE INVENTION

Hereinafter, an electric braking system for a vehicle according to an embodiment of the invention will be described with reference to the drawings.

<Overall Configuration of Electric Braking System for Vehicle According to Embodiment of the Invention>

Figure 1:
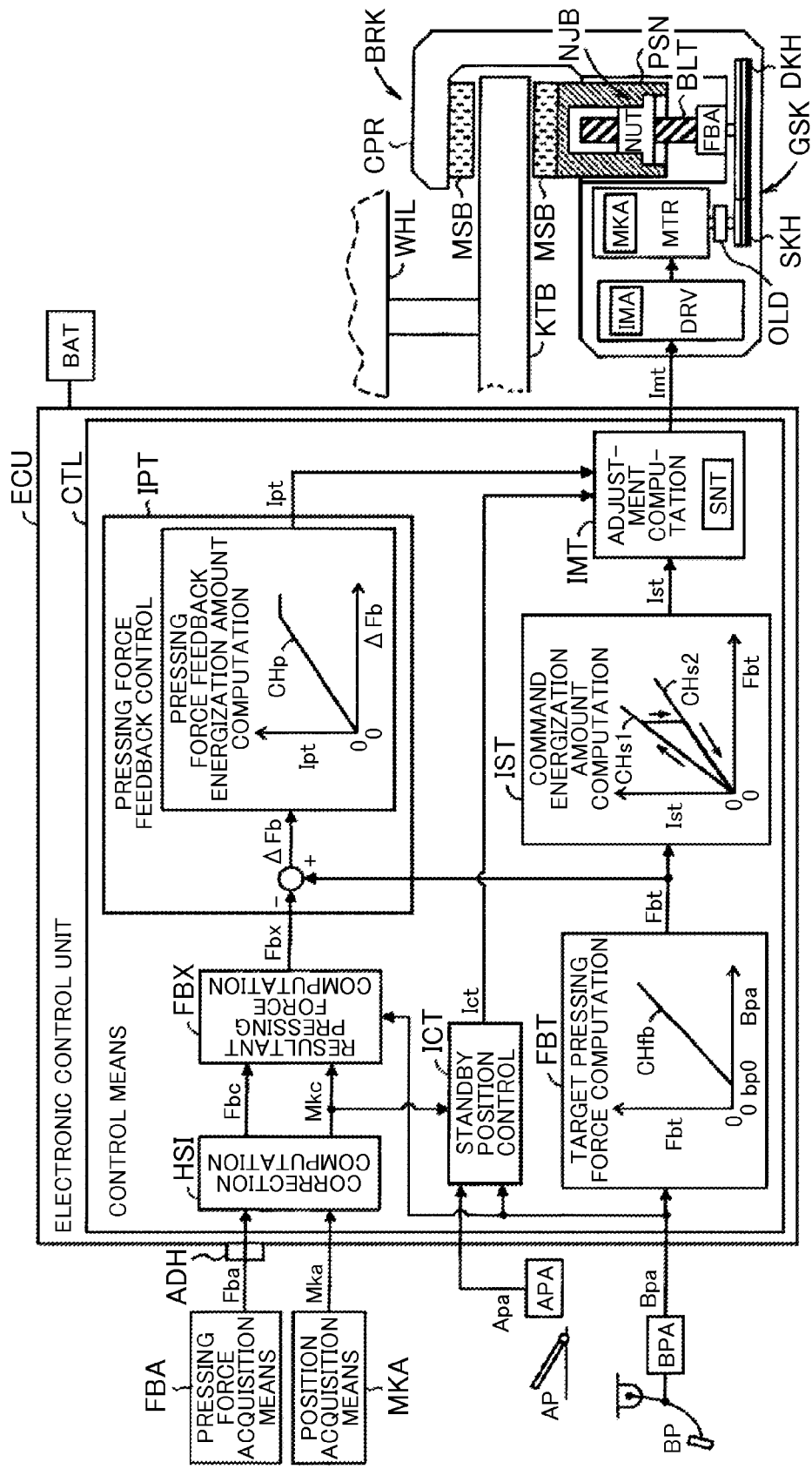
FIG. 1 is an overall configuration view of an electric braking system for a vehicle according to an embodiment of the invention.

As shown in FIG. 1, a vehicle including the electric braking system includes a braking operation member BP, an accelerating operation member AP, an electronic control unit ECU, braking means (brake actuator) BRK, pressing force acquisition means (pressing force sensor) FBA, position acquisition means (rotation angle sensor) MKA and a storage battery BAT.

The braking operation member (for example, a brake pedal) BP is a member that is operated by a driver to decelerate the vehicle. On the basis of the operation amount of the braking operation member BP, the braking means (brake actuator) BRK adjusts the braking torque of each wheel WHL, and a braking force is generated in each wheel WHL.

The braking operation member BP includes braking operation amount acquisition means BPA. A driver's operation amount (braking operation amount) Bpa of the braking operation member BP is acquired (detected) by the braking operation amount acquisition means BPA. A sensor (pressure sensor) that detects the pressure of a master cylinder (not shown) or a sensor (brake pedal depression force sensor or brake pedal stroke sensor) that detects an operation force on the braking operation member BP and/or a displacement of the braking operation member BP is employed as the braking operation amount acquisition means BPA. Therefore, the braking operation amount Bpa is computed on the basis of at least any one of a master cylinder pressure, a brake pedal depression force and a brake pedal stroke. The braking operation amount Bpa is input to the electronic control unit ECU.

The accelerating operation member (for example, an accelerator pedal) AP is a member that is operated by the driver to accelerate the vehicle. The accelerating operation member AP includes accelerating operation amount acquisition means (for example, a stroke sensor or a throttle opening degree sensor) APA. The braking means BRK may also be controlled on the basis of an accelerating operation amount Apa. The operation amount (accelerating operation amount) Apa of the accelerating operation member may be computed on the basis of at least any one of an operation force on the accelerating operation member and a displacement (for example, a stroke of the accelerator pedal) of the accelerating operation member. A throttle opening degree of an engine may be employed as Apa. The accelerating operation amount Apa is input to the electronic control unit ECU.

At least one of the braking operation amount Bpa and the accelerating operation amount Apa may be computed or acquired in another electronic control unit (for example, an electronic control unit for steering control or an electronic control unit for powertrain control) and its computed value (signal) may be transmitted to the ECU via a communication bus.

The electronic control unit ECU has control means (control algorithm) CTL programmed therein to control the braking means BRK, and controls the BRK on the basis of the CTL. The storage battery (battery) BAT is a power supply that supplies electric power to the BRK, the ECU, and the like.

The position acquisition means (for example, an angle sensor) MKA detects an actual position (for example, actual rotation angle) Mka of a rotor (rotating element) of an electric motor MTR that is a power source of the BRK. The position acquisition means MKA is provided inside the electric motor MTR. The actual position Mka is input to the electronic control unit ECU (particularly, the control means CTL).

The pressing force acquisition means FBA acquires (detects) a reaction force (reaction) of a force (pressing force) Fba that a pressing member PSN presses friction members MSB. Specifically, in the pressing force acquisition means FBA, the pressing force Fba is detected on the basis of an electrical change (for example, a voltage change) due to a displacement (that is, a strain) that arises in the case of receiving a force, as in the case of a strain gauge. The pressing force acquisition means FBA is provided between a bolt member BLT and a caliper CPR. For example, the pressing force acquisition means FBA is fixed to the caliper CRP, and a force that the pressing member PSN receives from the friction members MSB is acquired as the pressing force Fba. The pressing force Fba is input to the electronic control unit ECU (particularly, the control means CTL) via analog-digital conversion means (AD conversion means) ADH. Although the detected signal of the FBA is an analog value, the detected signal of the FBA is converted to a digital value by the analog-digital conversion means ADH, and is input to the electronic control unit ECU. At this time, the resolution (least significant bit (LSB)) of the pressing force Fba is determined depending on the number of bits of the conversion means ADH.

<Control Means CTL>

The control means CTL is composed of a target pressing force computing block FBT, a command energization amount computing block IST, a correction computing block HSI, a resultant pressing force computing block FBX, a pressing force feedback control block IPT, a standby position control block ICT and an energization amount adjustment computing block IMT. The control means (control program) CTL is programmed in the electronic control unit ECU.

In the target pressing force computing block FBT, a target pressing force Fbt of each wheel WHL is computed on the basis of the braking operation amount Bpa and a preset target pressing force computing characteristic (computing map) CHfb. The target pressing force Fbt is a target value of the pressing force that is the force that the friction members (brake pads) MSB press the rotary member (brake disc) KTB in the electric braking means BRK. When Bpa is larger than or equal to zero and is smaller than a predetermined operation amount bp0, Fbt is computed to zero. When Bpa is larger than or equal to the predetermined operation amount bp0, Fbt is computed so as to monotonously increase with an increase in Bpa. The predetermined value bp0 corresponds to a play of the brake pedal BP. The play is provided for an operating mechanism (man-machine interface) and is a range or a clearance within which an operation does not influence an actual action.

In the command energization amount computing block IST, a command energization amount Ist is computed on the basis of preset command energization amount computing characteristics (computing map) CHs1, CHs2 and the target pressing force Fbt. The command energization amount Ist is a target value of the energization amount of the electric motor MTR for achieving the target pressing force Fbt by driving the electric motor MTR of the electric braking means BRK. The computing map for Ist is composed of two characteristics CHs1, CHs2 in consideration of the hysteresis of the electric braking means BRK. The characteristic CHs1 corresponds to the case where the pressing force is increased. The characteristic CHs2 corresponds to the case where the pressing force is reduced. Therefore, in comparison with the characteristic CHs2, the characteristic CHs1 is set so as to output the relatively large command energization amount Ist.

The energization amount is a state quantity (variable) for controlling an output torque of the electric motor MTR. The electric motor MTR outputs a torque substantially proportional to a current, so a target current value of the electric motor MTR may be used as a target value of the energization amount. An increase in voltage supplied to the electric motor MTR results in an increase in current, so a supplied voltage value may be used as the target energization amount. In addition, the supplied voltage value may be adjusted by a duty ratio in pulse width modulation (PWM), so the duty ratio may be used as the energization amount.

In the correction computing block HSI, a zero point of the pressing force acquisition means FBA (for example, the pressing force sensor) and a zero point of the position acquisition means MKA (for example, the rotation angle sensor) are corrected. A signal from the FBA (pressing force Fba) and a signal from the MKA (actual position Mka) are input to the correction computing block HSI, the zero points are corrected in the correction computing block HSI, and then the corrected actual pressing force (corrected pressing force) Fbc and the corrected actual position (corrected position) Mkc are output. In the case of the pressing force acquisition means FBA, the zero point indicates a detected value (acquired value) in a state where no pressing force (force that the MSBs press the KTB) is actually generated. In the case of the position acquisition means MKA, the zero point indicates a reference position that is a boundary between a side in which a pressing force is generated between the MSBs and the KTB and a side in which the pressing force is note generated (that is, a boundary between a side in which the MSBs and the KTB contact with each other and a side in which the MSBs and the KTB do not contact with each other). A deviation (drift) of the output value of the FBA from the zero point is called zero-point drift. That is, the zero-point drift of the FBA is a deviation in a situation that no pressing force is actually generated (a drift from zero).

In the resultant pressing force computing block FBX, a resultant pressing force Fbx is computed on the basis of the braking operation amount Bpa, the actual position (corrected) Mkc of the electric motor MTR and the actually generated pressing force (corrected actual pressing force value) Fbc. Specifically, an estimated pressing force value Fbe is computed on the basis of a rotor position (rotation angle) Mkc of the electric motor, and the resultant pressing force Fbx is computed by taking contribution degrees (coefficients that determine influence degrees) Ka1, Ke2 for the actual pressing force value Fbc, acquired by the pressing force acquisition means FBA, and the estimated pressing force value Fbe into consideration. That is, the resultant pressing force Fbx corresponds to the force (pressing force) that the MSBs are pressed against the KTB, and is computed on the basis of the two different detected signals (Fbc, Mkc).

The estimated pressing force value Fbe is estimated on the basis of the rotor position Mkc (corrected Mka) and the stiffness value Gcp of the braking means BRK (Fbe=Mkc× Gcp). The contribution degree (first contribution degree) Ka1 for the actual pressing force value Fbc (corrected Fba) and the contribution degree (second contribution degree) Ke2 for the estimated pressing force value Fbe are computed on the basis of the braking operation amount Bpa. The first and second contribution degrees Ka1, Ke2 are coefficients that determine the influence degrees (the degrees of contribution) of Fbc, Fbe in computing the resultant pressing force Fbx. The first contribution degree Ka1 increases with an increase in the braking operation amount Bpa. The second contribution degree Ke2 decreases with an increase in Bpa. That is, in computing the resultant pressing force Fbx, the influence degree of the estimated pressing force value Fbe that is computed on the basis of the position Mkc of the electric motor is higher than the influence degree of the actual pressing force value Fbc in the case where the braking operation amount Bpa is small, and the influence degree of Fbc is increased and the influence degree of Fbe is reduced as Bpa increases.

In the pressing force feedback control block IPT, a pressing force feedback energization amount Ipt is computed on the basis of the target pressing force (target value) Fbt and the resultant pressing force Fbx. The command energization amount Ist is computed as a value corresponding to the target pressing force Fbt; however, there may arise an error (steady error) between the target pressing force Fbt and the pressing force Fbx due to fluctuations in the efficiency of the electric braking means BRK. The pressing force feedback energization amount Ipt is computed on the basis of a deviation (pressing force deviation) ΔFb between the target pressing force Fbt and the resultant pressing force Fbx and a preset computing characteristic (computing map) CHp, and is determined so as to reduce the above-described error. That is, on the basis of the computing map CHp, the pressing force feedback energization amount Ipt is computed so as to increase as the pressing force deviation ΔFb (=Fbt−Fbx) increases.

In the standby position control block ICT, a target energization amount Ict for controlling the position of the pressing member PSN in the case where the braking operation member BP is not operated by the driver or slightly operated by the driver (braking torque is not so generated as to decelerate the vehicle) is computed. Position control over the PSN is called standby position control. In the standby position control, the position of the pressing member PSN (that is, the position of the MTR) while not braking is controlled, and, eventually, the clearances between the friction members MSB and the rotary member KTB (that is, a drag state of the MSBs) are adjusted. In the standby position control block ICT, the target energization amount Ict for executing the standby position control is computed on the basis of the braking operation amount Bpa and the accelerating operation amount Apa. When the accelerating operation amount Apa is large (when a vehicle acceleration is high), the target energization amount (standby energization amount) Ict for the standby position control is determined such that the pressing member PSN is more distant from the rotary member KTB. After the accelerating operation amount Apa is returned to zero (not operated), the standby energization amount Ict is determined such that the PSN approaches the KTB with an increase in the braking operation member Bpa.

In the energization amount adjustment computing block IMT, a target energization amount Imt that is a final target value of the electric motor MTR is computed. The command energization amount Ist, the pressing force feedback energization amount Ipt and the standby energization amount Ict are adjusted, and the target energization amount Imt is computed. The target energization amount Imt is the final target value of the energization amount for controlling the output of the electric motor MTR. The rotation direction of the electric motor MTR (a forward direction in which the pressing force increases or a reverse direction in which the pressing force reduces) is determined on the basis of the sign of the target energization amount Imt (the value is positive or negative), and the output (rotational power) of the electric motor MTR is controlled on the basis of the magnitude (absolute value) of the target energization amount Imt.

A selection computing block SNT is included in the energization amount adjustment computing block IMT, and a selection from between (a switch between) pressing force feedback control (Ist, Ipt) and position feedback control (Ict) is carried out. When the pressing force feedback control is selected (when the driver is requiring the vehicle to decelerate), the target energization amount Imt (=Ist+Ipt) is computed in the selection computing block SNT by adding the pressing force feedback energization amount Ipt to the command energization amount Ist. On the other hand, when the position feedback control is selected (when the driver is not requiring the vehicle to decelerate), the standby energization amount Ict is computed in the SNT as the final target energization amount Imt (=Ict).

<Electric Braking Means BRK>

In the electric braking system according to the embodiment of the invention, generation and adjustment of the braking torque of each wheel WHL of the vehicle are carried out by the electric motor MTR. The electric braking means (brake actuator) BRK is composed of the brake caliper (for example, a floating caliper) CPR, the rotary member (for example, a brake disc) KTB, the friction members (for example, brake pads) MSB, the electric motor MTR, driving means (an electrical circuit for driving the MTR) DRV, a coupling member (for example, an Oldham coupling) OLD, a speed reducer GSK, a rotational motion-linear motion converter (for example, a screw member) NJB, the pressing force acquisition means FBA, the position acquisition means MKA and energization amount acquisition means IMA.

The braking means BRK, as well as a known braking device, includes the known brake caliper CPR and the friction members MSB. A friction force is generated when the friction members MSB are pressed against the known rotary member KTB, a braking torque is applied to each wheel WHL, and a braking force is generated.

The brake caliper CPR is a floating caliper, and is configured to sandwich the rotary member (brake disc) KTB via the two friction members (brake pads) MSB. Inside the caliper CPR, the pressing member PSN is caused to slide and advance toward the rotary member KTB or recede from the rotary member KTB. The pressing member (brake piston) PSN generates a friction force by pressing the friction members MSB against the rotary member KTB.

Each of the friction members (for example, brake pads with a back plate) MSB is replaceable when abraded. Therefore, the MSBs and the PSN are not fixed to each other (not integrally bonded to each other). That is, the friction members (brake pads with a back plate) MSB and the pressing member (piston) PSN have separate structures. When the braking torque is increased, the MSBs advance toward the rotary member (brake disc) KTB as the pressing member PSN presses the back plate portion of one of the friction members MSB. When the braking torque is reduced, the MSBs recede from the KTB in the separating direction by the reaction force that is generated because of the overall stiffness of the BRK (the stiffness of the CPR and the stiffness of each MSB).

A brushed motor or a brushless motor is employed as the electric motor MTR. In the rotation direction of the electric motor MTR, the forward direction corresponds to the direction in which the pressing member PSN approaches the rotary member KTB (the direction in which the pressing force increases and the braking torque increases), and the reverse direction corresponds to the direction in which the pressing member PSN separates from the rotary member KTB (the direction in which the pressing force reduces and the braking torque reduces). The output of the electric motor MTR is determined on the basis of the target energization amount Imt that is computed by the control means CTL. Specifically, when the sign of the target energization amount Imt is positive (+: plus) (Imt>0), the electric motor MTR is driven in the forward direction; whereas, when the sign of Imt is negative (−: minus) (Imt<0), the electric motor MTR is driven in the reverse direction. The rotational power of the electric motor MTR is determined on the basis of the magnitude (absolute value) of the target energization amount Imt. That is, the output torque of the electric motor MTR increases as the absolute value of the target energization amount Imt increases, and the output torque reduces as the absolute value of the target energization amount Imt reduces.

In the driving means (which is an electrical circuit for driving the electric motor MTR, and is a driving circuit) DRV, an energization amount (eventually, a current value) to the electric motor MTR is controlled on the basis of the target energization amount (target value) Imt. Specifically, the driving means DRV is composed of a bridge circuit that uses a plurality of switching elements (power transistors, and, for example, MOS-FETs or IGBTs). Those elements are driven on the basis of the target energization amount Imt of the electric motor, and the output of the electric motor MTR is controlled. Specifically, the rotation direction and output torque of the electric motor MTR are adjusted by switching the switching elements between conductive and non-conductive states.

The output (rotational power) of the electric motor MTR is transmitted to the pressing member PSN in order of the coupling member OLD, the speed reducer GSK and the rotational motion-linear motion converter (screw member) NJB. The pressing member (brake piston) PSN is caused to advance toward the rotary member (brake disc) KTB or recede from the rotary member (brake disc) KTB. Thus, the force (pressing force) that the friction members (brake pads) MSB press the rotary member KTB is adjusted. Because the rotary member KTB is fixed to each wheel WHL, a friction force arises between the friction members MSB and the rotary member KTB, and a braking force arises in each wheel WHL.

The coupling member OLD is a shaft coupling for absorbing decentering (shaft imperfect alignment) between the rotary shaft (hereinafter, referred to as motor shaft) of the electric motor MTR and the rotary shaft (input shaft) of the speed reducer GSK, and, for example, an Oldham coupling is employed. In the Oldham coupling, decentering between the two shafts (the motor shaft and the input shaft) having different axes is absorbed by a slip of fitting between the protrusion (key) of a disc and the groove (key groove) of a slider, and rotational power (rotation motion) is transmitted.

The speed reducer GSK reduces the rotation speed of the electric motor MTR in the power of the electric motor MTR, and outputs the power of the electric motor MTR to the rotational motion-linear motion converter NJB (specifically, the bolt member BLT). That is, the rotation output (torque) of the electric motor MTR is increased in response to the reduction ratio of the speed reducer GSK, and the rotation force (torque) of the bolt member BLT is obtained. For example, the speed reducer GSK is composed of a small-diameter gear SKH and a large-diameter gear DKH. Not only a gear transmission mechanism but also a winding transmission mechanism, such as a belt and a chain, or a friction transmission mechanism may be employed as the speed reducer GSK.

The rotational motion-linear motion converter NJB is a feed screw, and is composed of the bolt member BLT and a nut member NUT. The bolt member BLT is fixed to the output shaft (for example, the rotary shaft of the large-diameter gear DKH) of the speed reducer GSK. The rotational power of the bolt member BLT is converted to linear power (thrust) via the nut member NUT, and the linear power (thrust) is transmitted to the pressing member PSN.

When the screw member NJB is composed of a trapezoidal screw thread (a slide screw that transmits power by sliding), the nut member NUT has a female thread (internal thread), and the bolt member BLT has a male thread (external thread). The female thread of the nut member NUT and the male thread of the bolt member BLT are screwed to each other. The rotational power (torque) transmitted from the speed reducer GSK is transmitted via the screw member NJB (mutually screwed male thread and female thread) as the linear power (thrust) of the pressing member PSN.

Instead of the slide screw, a rolling screw (such as a ball screw) that transmits power by rolling may be employed as the screw member NJB. In this case, the nut member NUT and the bolt member BLT each have a thread groove (ball groove), and operates as a rotational motion-linear motion conversion mechanism when balls (steel balls) are fitted to the thread groove.

The driving circuit DRV of the electric motor includes energization amount acquisition means (for example, a current sensor) IMA that detects an actual energization amount (for example, a current that actually flows through the electric motor) Ima. The electric motor MTR includes position detection acquisition means (for example, an angle sensor) MKA that detects the actual position (for example, the rotation angle) Mka of the rotor (rotating element). In addition, in order to acquire (detect) the force (actual pressing force) Fba that the friction members MSB actually press the rotary member KTB, the pressing force acquisition means (for example, the pressing force sensor) FBA is provided. The pressing force acquisition means FBA is fixed to the caliper CRP, and the force that the pressing member PSN receives from the friction members MSB is acquired as the pressing force Fba.

In the above-described configuration, the pressing force acquisition means FBA directly acquires (detects) the pressing force Fba. The specifications of the braking means BRK (for example, the gear ratio of the GSK, the lead of the NJB, and the like) are known, so the FBA may acquire a force-related state quantity of any movable member in a power transmission path from the electric motor MTR to the friction members MSB as the actual pressing force value (actual pressing force) Fba. Specifically, the above-described force-related state quantity is at least one of the output torque of the electric motor MTR, the output torque of the GSK, the thrust of the NJB, the thrust of the PSN and the pressing force of the MSBs, the actual pressing force value Fba may be indirectly acquired (computed) on the basis of the state quantity (single or multiple state quantities) and the specifications of the BRK.

Similarly, because the specifications of the braking means BRK are known, the position acquisition means MKA may acquire a position-related state quantity of any movable member in the power transmission path from the electric motor MTR to the friction members MSB as the position (actual position) Mka. Specifically, the above-described position-related state quantity is at least one of the position of the electric motor MTR, the position of the GSK, the position of the NJB, the position of the PSN or the position of the MSBs, and the position Mka may be indirectly acquired (computed) on the basis of the state quantity (single or multiple state quantities) and the specifications of the BRK (the gear ratio of the GSK, the lead of the NJB, and the like). That is, the MKA may not only directly acquire the position Mka of the electric motor but also may indirectly obtain the position Mka of the electric motor.

The configuration of a so-called disc braking system (disc brake) is illustrated as the electric braking means BRK; instead, the BRK may be a drum braking system (drum brake). In the case of the drum brake, the friction members MSB are brake shoes, and the rotary member KTB is a brake drum. Similarly, the force (pressing force) that the brake shoes press the brake drum is controlled by the electric motor MTR. The one that generates a torque through rotational motion is illustrated as the electric motor MTR; instead, a linear motor that generates a force through linear motion may be employed.

In the above configured braking means BRK, at the time when the pressing force is reduced, there is a section (ineffective displacement section) in which the pressing force does not reduce while the position of the electric motor changes. The ineffective displacement is due to clearances (rattles) in the power transmission members (the coupling member OLD, the speed reducer GSK, and the like) from the electric motor MTR to the pressing force acquisition means FBA. Specifically, the ineffective displacement arises as a result of a change of a portion (pressure receiving face) that receives the reaction of the pressing force due to the clearances in the power transmission members. In the coupling member (Oldham coupling), there is a clearance between the key (protrusion) and the key groove (recess), and there is a backlash of the speed reducer (speed reduction gear). One of the faces (the faces of the key and key groove of the Oldham coupling, the tooth flanks of the speed reduction gear) contacts when receiving the reaction of the pressing force, and the other one of the faces, opposite to the one of the faces (a face different from one of the contact faces), contacts when the friction loss (torque loss) of the electric motor MTR is cancelled out. The displacement (a change in position) of the electric motor, corresponding to the clearances in which the contact face switches corresponds to the ineffective displacement.

<Oldham Coupling OLD>

Figure 2:
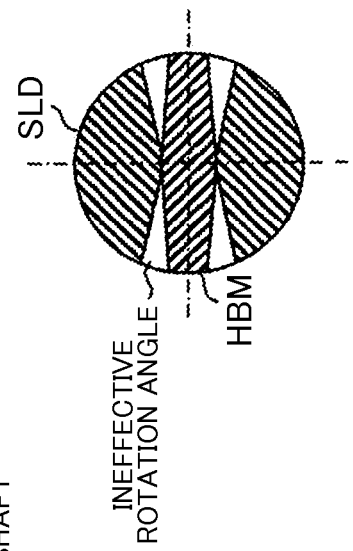
FIG. 2 is a schematic configuration view of an Oldham coupling.
Figure 2:
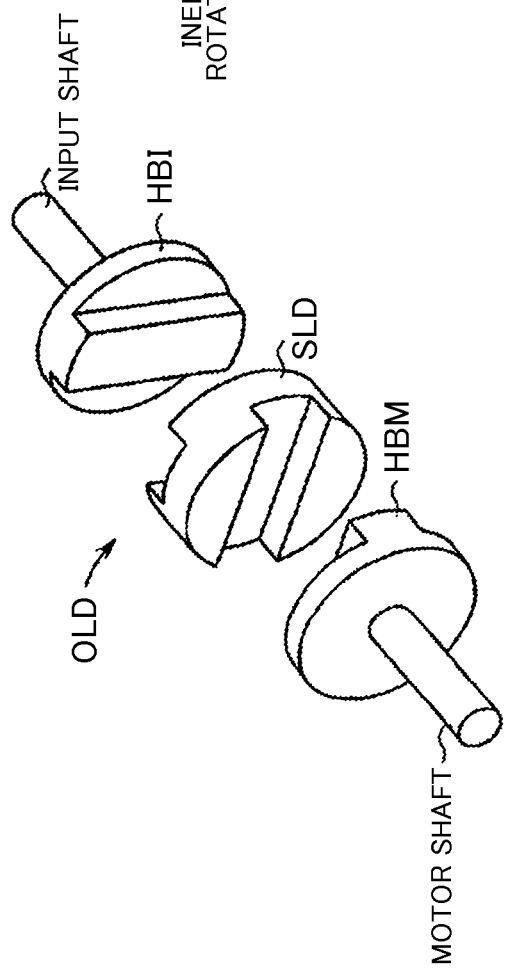

Next, the clearances in the Oldham coupling OLD will be described in detail with reference to FIG. 2. The Oldham coupling OLD is a coupling that transmits rotational power while allowing fitting of a protrusion (key) of a disc with a groove (key groove) of a slider to slide. The Oldham coupling OLD is composed of an input disc HBM, a slider (intermediate disc) SLD and an output disc HBI. As the protrusions of the discs HBM, HBI slide along the groove of the slider SLD, decentering between the two shafts (the motor shaft and the input shaft) having different axes is absorbed, and the rotational power (rotational motion) is transmitted.

As shown in FIG. 2(a), the input disc HBM is fixed to the output shaft (motor shaft) of the electric motor MTR. A key (protrusion) is provided on the face across from the face of the input disc HBM, to which the motor shaft is fixed. A key groove (dent) is provided in the slider SLD so as to be in mesh with the key of the input disc HBM. Another key groove is provided on the face across from the side of the slider SLD, on which the key groove is provided, so as to be perpendicular to the key groove. A key (protrusion) is provided in the output disc HBI so as to be in mesh with the key groove (dent) of the slider SLD, and the output disc HBI is fixed to the shaft (input shaft) of the speed reducer GSK (small-diameter gear SKH) on the face on the back side of the face having the key. That is, the HBM, the SLD and the HBI are meshed with each other such that the protrusion of the input disc HBM is perpendicular to the protrusion of the output disc HBI. In the Oldham coupling OLD, decentering between the output shaft (motor shaft) of the electric motor MTR and the input shaft of the speed reducer is absorbed by a slide of the keys of the HBM and HBI along the corresponding key grooves of the slider SLD.

When a relatively large torque is exerted on the Oldham coupling OLD, the keys of the HBM and HBI and the key grooves of the SLD may deform or abrade and a backlash (clearances between contact faces of mechanical elements in the direction of motion) may increase. FIG. 2(b) is a cross-sectional view of a fitting portion at which the input disc HBM and the slider SLD are fitted. When there is no abrasion, or the like, the key and the key groove are fitted to each other with a slight clearance. However, when the clearance increases because of abrasion, or the like, there arises an ineffective displacement (ineffective rotation angle) that the input shaft of the GSK is not rotated even when the motor output shaft rotates in the rotation direction of the Oldham coupling OLD. The ineffective displacement in the Oldham coupling OLD is one of causes (another cause is a backlash of the GSK) due to which the state where Fba is not reduced even when Mka is reduced in the case where the pressing force (that is, braking torque) is reduced.

<First Embodiment of Correction Computing Block HSI>

Figure 3:
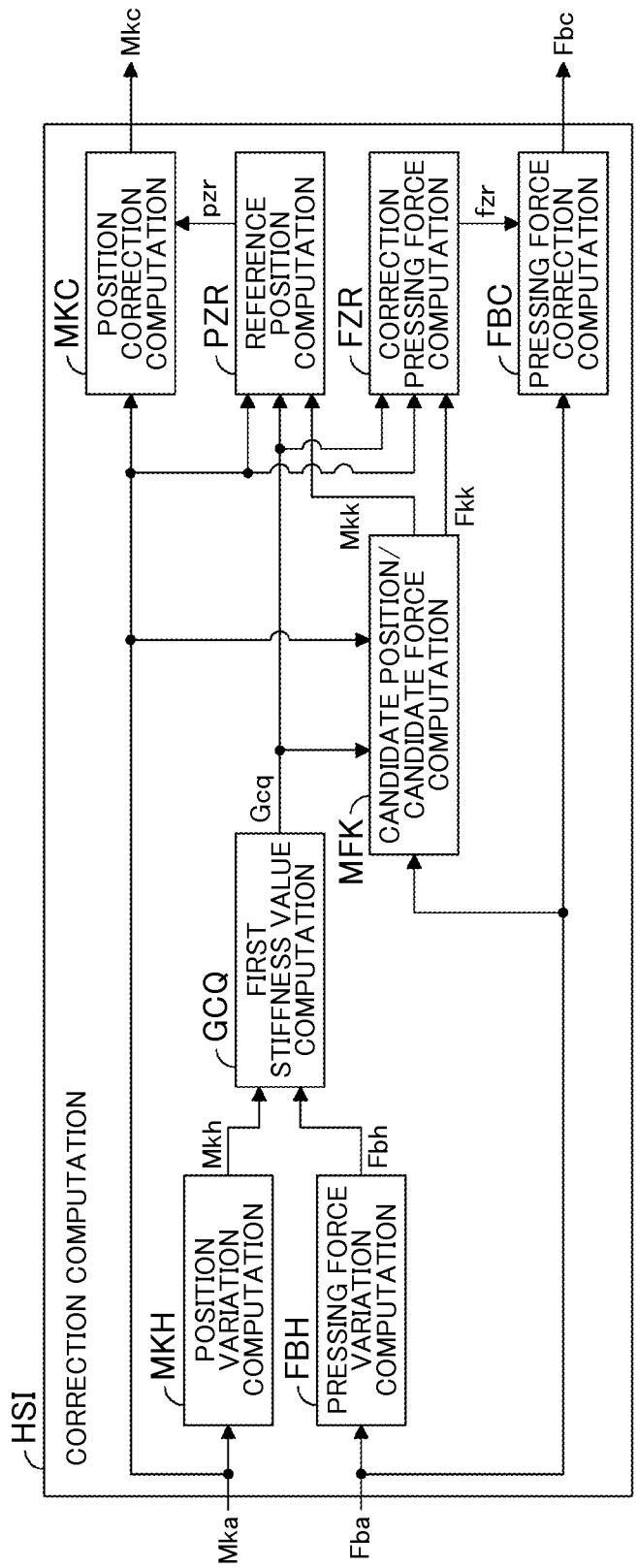
FIG. 3 is a functional block diagram for illustrating a first embodiment of a correction computing block.

Next, a first embodiment of the correction computing block HSI will be described with reference to the functional block diagram of FIG. 3. In the correction computing block HSI, the zero point of the position acquisition means MKA (for example, the rotation angle sensor) and the zero point of the pressing force acquisition means FBA (for example, the pressing force sensor) are corrected. The zero point of the position acquisition means MKA is a reference position at a boundary between the side in which the pressing force is generated between the MSBs and the KTB and the side in which the pressing force is not generated (that is, a boundary between the side in which the MSBs and the KTB contact with each other and the side in which the MSBs and the KTB do not contact with each other). The zero point of the pressing force acquisition means FBA is a value that indicates a state where no pressing force (force that the MSBs press the KTB) is actually generated. A deviation (drift, offset) from the zero point of the FBA is called zero-point drift.

The correction computing block HSI is composed of a position variation computing block MKH, a pressing force variation computing block FBH, a first stiffness value computing block GCQ, a candidate position/candidate force computing block MFK, a reference position computing block PZR, a position correction computing block MKC, a correction pressing force computing block FZR and a pressing force correction computing block FBC.

In the position variation computing block MKH, a position variation Mkh is corrected on the basis of the actual position Mka of the electric motor. Specifically, a previous value (a value in a previous computation period) mka[k] of Mka is stored, the previous value is compared with a present value (a value in the current computation period) mka[g] of Mka, and the deviation is computed as the position variation Mkh. That is, the position variation Mkh is computed in accordance with Mkh=mka[k]−mka[g]. The previous value mka[k] is a computed value one or multiple computation periods before the present period (current period), and is a computed value a predetermined time (predetermined value) th0 before the present value (current value) mka[g]. That is, in computation periods, a predetermined period (fixed value) has elapsed from the previous value mka[k] to the present value mka[g].

In the pressing force variation computing block FBH, a pressing force variation Fbh is computed on the basis of the actual pressing force value Fba. Specifically, in each computation period, the previous value fba[k] of Fba, corresponding to the previous value mka[k] of Mka, is compared with the present value fba[g] of Fba, corresponding to the present value mka[g] of Mka, and the deviation is computed as the pressing force variation Fbh. That is, the pressing force variation Fbh is computed in accordance with Fbh=fba[k]−fba[g]. mka[k] and fba[k] are values in the same computation period, and mka[g] and fba[g] are values in the same computation period.

In the first stiffness value computing block GCQ, a first stiffness value (which corresponds to an actual stiffness value) Gcq is computed on the basis of the position variation Mkh and the pressing force variation Fbh. Specifically, the pressing force variation Fbh to the position variation Mkh is computed as the first stiffness value Gcq (=Fbh/Mkh). The stiffness value (actual value) Gcq is a value that corresponds to the spring constant of series-connected springs of the caliper CPR and the friction members MSB. Therefore, the first stiffness value Gcq is computed by dividing the pressing force variation (for example, a temporal variation in pressing force) Fbh by the position variation (for example, a temporal variation in position) Mkh.

When the electric motor MTR is rotated in the reverse direction (that is, Bpa is reduced), a candidate (candidate position) Mkk for the position (reference position) that is a reference of the position (rotation angle) of the electric motor and a candidate (candidate force) Fkk for correcting the pressing force are computed in the candidate position/candidate force computing block MFK on the basis of the actual position Mka, the actual pressing force Fba and the first stiffness value Gcq. Specifically, Mka and Fba at time (current computation period) at which the first stiffness value Gcq changes from a state higher than or equal to a predetermined value gcqx (a state one computation period before) to a state lower than gcqx are respectively stored as the candidate position Mkk and the candidate force Fkk. That is, in the computation period of Gcq, when the last value (computed value in the last computation period) gcq[g−1] is higher than or equal to gcqx and the current value (computed value in the present computation period) gcq[g] is lower than gcqx, the current value mka[g] of the electric motor position is computed as the candidate position Mkk, the current value fba[g] of the pressing force is computed as the candidate force Fkk, and both are stored. Therefore, the pressing force corresponding to the candidate position Mkk is stored as the candidate force Fkk.

In the reference position computing block PZR, a reference position pzr is determined on the basis of the actual position Mka, the first stiffness value Gcq and the candidate position Mkk. Specifically, in the reference position computing block PZR, from time at which the candidate position Mkk is determined, whether the first stiffness value Gcq is lower than the predetermined value (Gcq<gcqx) is monitored. At time at which the state where Gcq<gcqx has continued over a displacement (clearance corresponding value) skh corresponding to the clearances in the power transmission members GSK, and the like, at Mka (that is, in the intended computation period), the candidate position Mkk is determined as the reference position pzr. However, when the state where Gcq<gcqx has not continued over the clearance corresponding value (displacement) skh, Mkk is deleted (reset) at time at which Gcq becomes higher than or equal to gcqx.

In the reference position computing block PZR, a value at the time of the last braking is set as the reference position pzr until the reference position pzr is newly updated with the candidate position Mkk. The clearance corresponding value skh is a value corresponding to the mechanical clearances in the power transmission path of the BRK, and is a threshold value that is set in advance as a design value.

In the position correction computing block MKC, Mka acquired by the MKA is corrected by the reference position pzr, and the corrected electric motor position (corrected position) Mkc is computed. Mka at time at which Mka is set for the reference position pzr is set as the zero point, and the corrected position Mkc is computed. In other words, at the corrected position Mkc, the reference position pzr that is a boundary between the side in which the pressing force is generated between the MSBs and the KTB and the side in which the pressing force is not generated is set for the zero-point position of the position acquisition means (rotation angle sensor) MKA.

In the correction pressing force computing block FZR, a correction pressing force fzr corresponding to the zero-point drift of Fba acquired by the FBA is computed on the basis of the actual position Mka, the first stiffness value Gcq and the candidate force Fkk. As in the case of the method of determining the reference position pzr, the actual pressing force Fba at the time when the first stiffness value Gcq changes from the state higher than or equal to the predetermined value gcqx (state one computation period before) to the state lower than gcqx (current computation period) is stored as the candidate force (candidate for the correction pressing force) Fkk, and the candidate force Fkk is employed as the correction pressing force fzr at time at which the state where Gcq<gcqx has continued over the clearance corresponding value skh at Mka. Therefore, the reference position pzr and the correction pressing force fzr are determined at the same time (in the same computation period). Therefore, the pressing force corresponding to the reference position pzr is determined as the correction pressing force fzr. When the state where Gcq<gcqx has not continued over the clearance corresponding value skh, the correction candidate force Fkk is once deleted (reset) at the time when Gcq becomes higher than or equal to gcqx.

In the pressing force correction computing block FBC, the actual pressing force Fba is corrected on the basis of the correction pressing force fzr, and the corrected pressing force (corrected pressing force) Fbc is computed. Because the correction pressing force fzr corresponds to the zero-point drift of the pressing force acquisition means FBA, an error is compensated by subtracting the correction pressing force fzr from the actual pressing force Fba, and the corrected pressing force Fbc is computed.

A phase difference may arise between the detected signals of Mka and Fba. Therefore, in the correction computing block HSI, a correction computing process may be executed only when the rate of change dMka in Mka (the speed of the electric motor) is lower than or equal to a predetermined rate (predetermined value) dmk1. That is, only when the operation speed dBpa of Bpa is gentle (lower than a predetermined value dbp1), the reference position pzr and the correction pressing force fzr may be determined.

When the electric motor MTR is rotated in the reverse direction and Fba is reduced, a speed limit (limit value dmk2) may be set for the MTR within a predetermined region close to the reference position pzr. Alternatively, the MTR may be returned toward the zero point at a preset constant rate dmk3. That is, even when Bpa is rapidly returned, the speed of the PSN may be limited as the PSN approaches the reference position pzr. As a result, the influence of the above-described phase difference may be compensated.

Because there is a correlation between a time and a displacement of the electric motor (when the speed of the electric motor is constant, proportional relation), a threshold skt for a time may be employed as the clearance corresponding value instead of the threshold skh for a displacement. That is, in the condition related to the clearance corresponding value, it is determined whether the state where Gcq<gcqx has continued over the time skt.

The reference position pzr is not immediately determined at time at which the stiffness value Gcq (which corresponds to the spring constant of the BRK) becomes lower than or equal to the predetermined value gcqx, and the reference position pzr is not determined until this state (the state where Gcq<gcqx) has continued over the clearance corresponding value skh or skt. Therefore, even when there is an ineffective displacement due to the clearances in the power transmission members, such as the speed reducer, the reference position pzr can be accurately determined. Because the stiffness value (actual value) Gcq is computed as the ratio of the pressing force variation Fbh to the position variation Mkh, the influences of errors (particularly, the zero-point drift of the FBA) of the acquisition means (sensors) can be compensated. The clearances in the power transmission members include, for example, the backlash of the gears, the clearances in the coupling, and the clearances in bearings. In addition, these clearances be increased by aged abrasion. Therefore, the clearance corresponding value skh or skt may be a value (preset predetermined value) that takes the clearances in the power transmission members, including aged abrasion, into consideration.

A force is detected by measuring the strain (displacement that arises in the case of receiving a force) of a strain element. In this detection of the strain, a drift (offset) of a detected value may cause a problem. The actual pressing force Fba at the candidate position Mkk is stored, and the zero-point drift value fzr is determined on the basis of the actual pressing force Fba at time at which the condition of the clearance corresponding value is satisfied and the reference position pzr is determined. Therefore, the zero-point drift of the FBA can be reliably compensated.

<Resultant Pressing Force Computing Block FBX>

Figure 4:
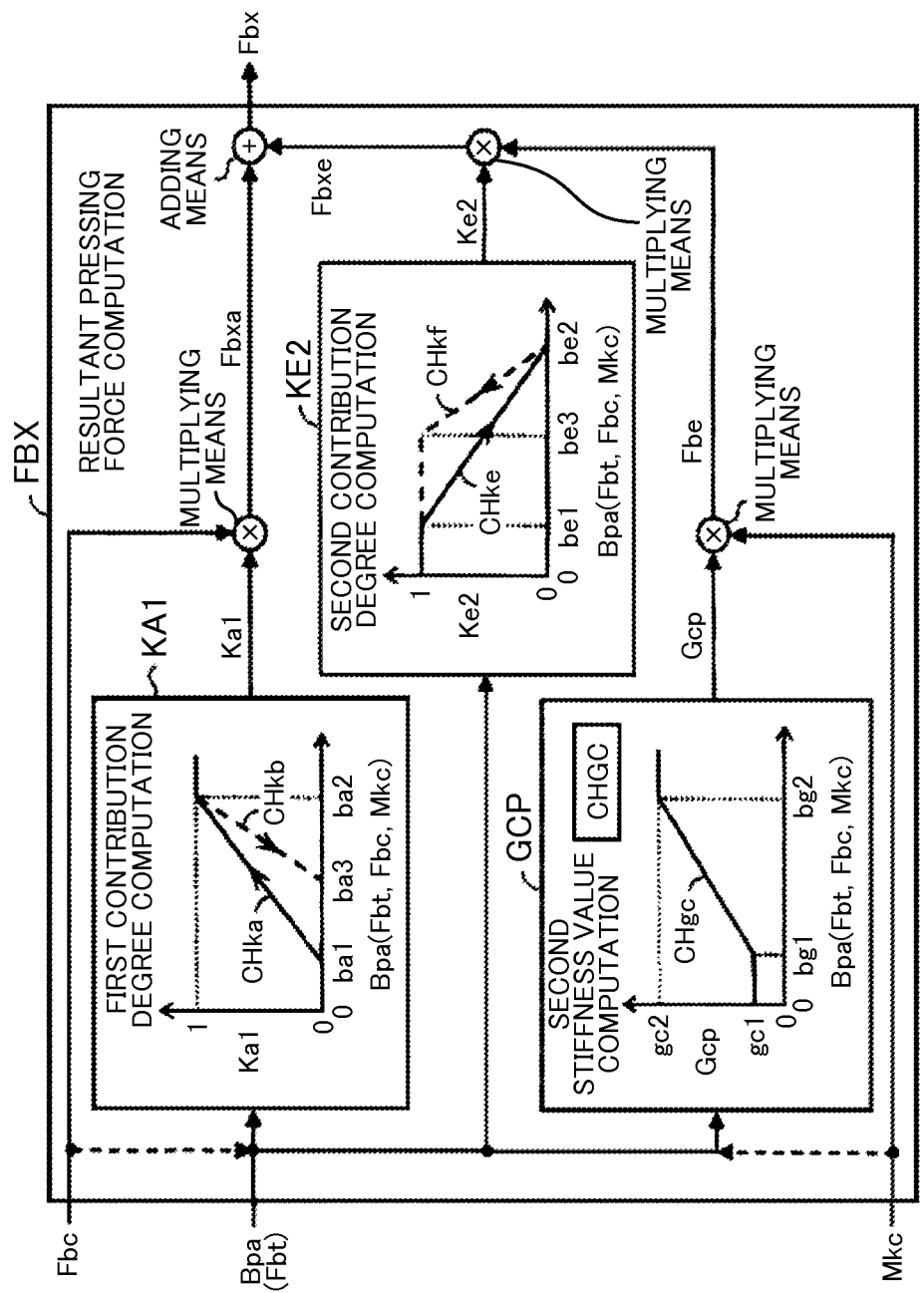
FIG. 4 is a functional block diagram for illustrating a resultant pressing force computing block shown in FIG. 1.

Next, an embodiment of the resultant pressing force computing block FBX will be described with reference to FIG. 4. The resultant pressing force computing block FBX is composed of a first contribution degree computing block KA1, a second contribution degree computing block KE2 and a second stiffness value computing block GCP.

In the first contribution degree computing block KA1, the first contribution degree Ka1 is computed on the basis of the braking operation amount Bpa. The first contribution degree Ka1 is a coefficient that determines the influence degree of the actual pressing force value (corrected actual pressing force) Fbc in computing the resultant pressing force Fbx. The first contribution degree Ka1 is computed on the basis of the braking operation amount Bpa and the computing characteristic (computing map) CHka. When Bpa is smaller than a predetermined value ba1, Ka1 is computed to zero; whereas, when Bpa is larger than or equal to the predetermined value ba1 and is smaller than a predetermined value ba2 (>ba1), Ka1 is increased (monotonously increased) with an increase in Bpa from zero to one. When Bpa is larger than or equal to the predetermined value ba2, Ka1 is computed to one. When Ka1=0, Fbc is not used in computing Fbx.

In the second contribution degree computing block KE2, the second contribution degree Ke2 is computed on the basis of the braking operation amount Bpa. The second contribution degree Ke2 is a coefficient that determines the influence degree of the estimated pressing force value (estimated pressing force) Fbe (pressing force that is estimated on the basis of Mkc) in computing the resultant pressing force Fbx. The second contribution degree Ke2 is computed on the basis of the braking operation amount Bpa and the computing characteristic (computing map) CHke. When Bpa is smaller than a predetermined value be1, Ke2 is computed to one; whereas, when Bpa is larger than or equal to the predetermined value be1 and is smaller than a predetermined value be2 (>be1), Ke2 is reduced (monotonously reduced) from one to zero with an increase in Bpa. When Bpa is larger than or equal to the predetermined value be2, Ke2 is computed as zero. When Ke2=0, Fbe is not used in computing Fbx.

In the second stiffness value computing block GCP, a second stiffness value Gcp is computed on the basis of the braking operation amount Bpa. The second stiffness value Gcp corresponds to the stiffness (spring constant) of the overall braking means. That is, Gcp indicates the spring constant of series-connected springs of the caliper CPR and the friction members MSB. The stiffness value (estimated value) Gcp is computed on the basis of the braking operation amount Bpa and a stiffness characteristic (computing map) CHgc. CHgc is a characteristic for estimating the stiffness value Gcp on the basis of Bpa. When Bpa is smaller than a predetermined value bg1, Gcp is computed as a predetermined value gc1; whereas, when Bpa is larger than or equal to the predetermined value bg1 and is smaller than a predetermined value bg2 (>bg1), Gcp is increased (monotonously increased) from the predetermined value gc1 to the predetermined value gc2 (>gc1) with an increase in Bpa. When Bpa is larger than or equal to the predetermined value bg2, Gcp is computed as the predetermined value gc2.

The estimated pressing force value Fbe is computed on the basis of the second stiffness value Gcp and the actual position (corrected) Mkc of the electric motor MTR. The estimated pressing force value Fbe is a pressing force that is estimated from Mkc. Specifically, the estimated pressing force value Fbe is computed by multiplying the second stiffness value Gcp, indicating the spring constant of the overall braking means, by the actual position (rotation angle) Mkc of the electric motor MTR.

An actual value component Fbxa that is an Fbc component in the resultant pressing force Fbx is computed on the basis of the actual pressing force value (corrected actual pressing force) Fbc and the first contribution degree Ka1. Fbxa is a component of the actual pressing force value Fbc in consideration of the influence degree by the use of Ka1. Specifically, Fbxa is determined by multiplying the actual pressing force value Fbc by the coefficient Ka1 (that is, Fbxa=Ka1×Fbc). An estimated value component Fbxe that is an Fbe component in the resultant pressing force Fbx is computed on the basis of the estimated pressing force value (pressing force estimated on the basis of Mkc) Fbe and the second contribution degree Ke2. Fbxe is a component of the estimated pressing force value Fbe in consideration of the influence degree by the use of Ke2. Specifically, Fbxe is determined by multiplying the estimated pressing force value Fbe by the coefficient Ke2 (that is, Fbxe=Ke2×Fbe=Ke2×Gcp×Mkc). The resultant pressing force Fbx is computed by adding the component (actual value component) Fbxa for the actual pressing force value and the component (estimated value component) Fbxe for the estimated pressing force value together (that is, Fbx=Fbxa+Fbxe=Ka1×Fbc+Ke2×Fbe). Therefore, the resultant pressing force Fbx is a pressing force that takes the influence degrees of Fbc and Fbe in response to the magnitude of Bpa.

The actual pressing force (before correction) Fba is detected by an element (strain detection element) that detects a strain (a deformation in the case where a force is exerted). Generally, an analog signal is transmitted from the strain detection element, the analog signal is analog-to-digital converted (AD converted), and is then taken into the electronic control unit ECU. Because the actual pressing force Fba before correction is input to the ECU via the analog-digital conversion means ADH, the resolution of detection of the pressing force depends on the performance (resolution) of AD conversion. On the other hand, the actual position (rotation angle) of the electric motor is taken into the ECU as a digital signal from a Hall IC or a resolver. In addition, the output of the electric motor is reduced in speed by the GSK, and the like, and is converted to the pressing force. Therefore, the estimated pressing force value Fbe that is computed from the electric motor position Mka that is acquired by the position acquisition means MKA has a higher resolution of the pressing force than the actual pressing force value Fba that is acquired by the pressing force acquisition means FBA. On the other hand, the estimated pressing force value Fbe is computed on the basis of the stiffness (spring constant) Gcp of the BRK. Because the second stiffness value Gcp fluctuates with an abrasion state of each friction member MSB, the actual pressing force value Fba has a higher reliability (a smaller error from a true value) than the estimated pressing force value Fbe.

Figure 8:
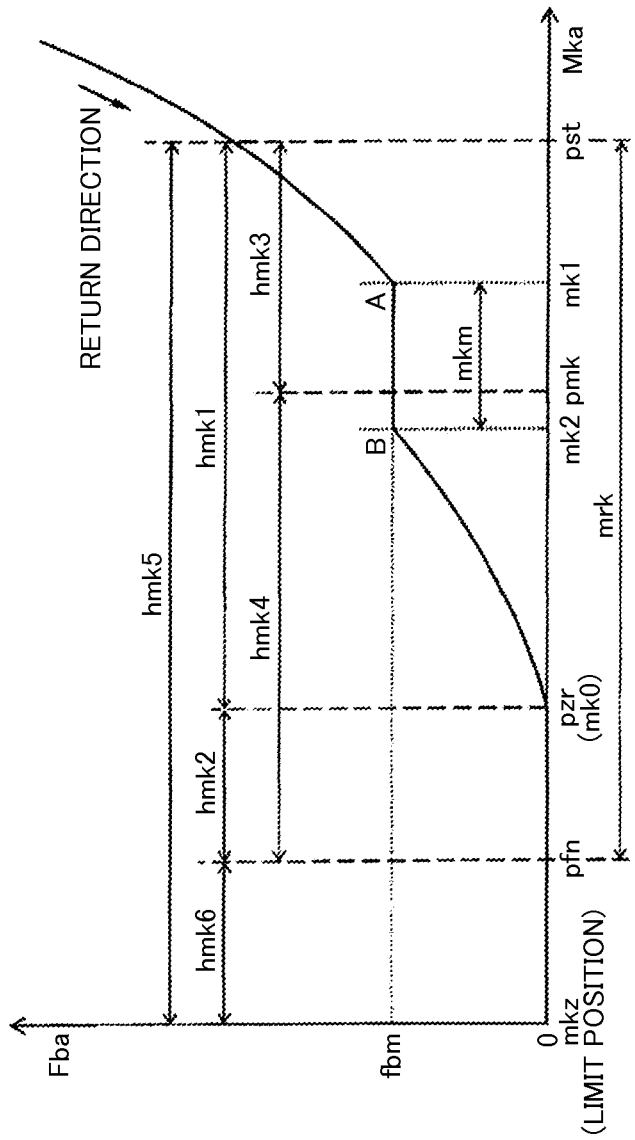
FIG. 8 is a view for illustrating a start position and an end position that are both end points of a storage section.

The characteristic of the pressing force Fba to the electric motor position Mka (that is, a change in the spring constant of the overall braking system) is nonlinear, and has a downward convex shape (see FIG. 8). Therefore, in a region in which the pressing force Fba is large, because the detection sensitivity of the pressing force Fba (a variation in pressing force to a displacement) is sufficiently high, the actual pressing force value Fba is usable for the pressing force feedback control. However, in a region in which the pressing force is small, because the detection sensitivity of the actual pressing force value Fba is low, the estimated pressing force value Fbe is desirably employed for the pressing force feedback control in addition to (or instead of) the actual pressing force value Fba.

From the above-described knowledge, when the braking operation amount Bpa is small, the first contribution degree Ka1 is computed to a relatively small value, and the second contribution degree Ke2 is computed to a relatively large value. As a result, in the region in which the pressing force is small (that is, the region in which the braking operation amount is small and the braking torque is small), which requires minute adjustment of the braking torque, the resolution of detecting a generated pressing force (least significant bit (LSB)) is improved, and precise pressing force feedback control can be executed. When the braking operation amount Bpa is large, Ka1 is computed to a relatively large value, Ke2 is computed to a relatively small value, the influence degree of the estimated pressing force value Fbe estimated from Mkc (that is, Mka) is reduced, and the influence degree of the actually detected actual pressing force value Fbc (that is, Fba) is increased. As a result, in the region in which the pressing force is large (that is, the braking operation amount is large and the braking torque is large), which requires that the correlation of the vehicle deceleration to the braking operation amount Bpa be constant, the pressing force feedback control having a high reliability (that is, based on the pressing force having a small error from a true value) can be executed.

In addition, when the braking operation amount Bpa is smaller than the predetermined operation amount (predetermined value) ba1, the first contribution degree Ka1 may be set to zero. When the braking operation amount Bpa is larger than the predetermined operation amount (predetermined value) be2 (>ba1), the second contribution degree Ke2 may be set to zero. As described above, the resolution of the pressing force feedback control in the region in which Bpa is small (the braking torque is small) can be improved, and the reliability of the pressing force feedback control in the region in which Bpa is large (the braking torque is large) can be improved.

In the computing characteristics CHka, CHke of the first and second contribution degrees Ka1, Ke2, instead of the braking operation amount Bpa (X-axis variable), at least one of the target pressing force Fbt, the actual pressing force value Fba and the actual position Mka (that is, a value corresponding to the braking operation amount) is used. This is because Fbt is computed on the basis of Bpa and the control results are Fba (Fbc) and Mka (Mkc).

The computing characteristics CHka, CHke may be set such that the predetermined values ba1, be1 are equal to each other and the predetermined values ba2, be2 are equal to equal other. In this case, any one of the first contribution degree computing block KA1 and the second contribution degree computing block KE2 may be omitted. When the first contribution degree computing block KA1 is omitted, the resultant pressing force Fbx is computed by using the second contribution degree Ke2 on the basis of Fbx=(1−Ke2)×Fbc+Ke2×Fbe. When the second contribution degree computing block KE2 is omitted, the resultant pressing force Fbx is computed by using the first contribution degree Ka1 on the basis of Fbx=Ka1×Fbc+(1−Ka1)×Fbe. The estimated pressing force value Fbe is computed on the basis of the stiffness value Gcp and the electric motor position Mkc (that is, Fbe=Gcp×Mkc).

In addition, in the computing characteristics of the first and second contribution degrees Ka1, Ke2, the characteristics CHka, CHke (indicated by the continuous lines in KA1, KE2) in the case where Bpa increases and the characteristics CHkb, CHkf (indicated by the broken lines in KA1, KE2) in the case where Bpa reduces may be separately set. In the computing characteristic of the first contribution degree Ka1, the computing characteristic CHka in the case where Bpa increases may be set so as to be larger than the computing characteristic CHkb in the case where Bpa reduces. In the computing characteristic of the second contribution degree Ke2, the computing characteristic CHke in the case where Bpa increases may be set so as to be smaller than the computing characteristic CHkf in the case where Bpa reduces.

In the first contribution degree computing block KA1, the computing characteristic CHka in the case where Bpa increases and the computing characteristic CHkb in the case where Bpa reduces are separately set, and CHkb is set so as to have a relatively smaller characteristic than CHka. In CHka, Ka1 is set to zero when Bpa is larger than or equal to zero and is smaller than the predetermined value ba1, Ka1 is set so as to monotonously increase with an increase in Bpa when Bpa is larger than or equal to the predetermined value ba1 and is smaller than the predetermined value ba2 (a value larger than ba1), and Ka1 is set to one when Bpa is larger than or equal to the predetermined value ba2. In CHkb, Ka1 is set to one when Bpa is larger than or equal to the predetermined value ba2, Ka1 is set so as to monotonously reduce with a reduction in Bpa when Bpa is larger than or equal to the predetermined value ba3 and is smaller than the predetermined value ba2, and Ka1 is set to zero when Bpa is larger than or equal to zero and is smaller than a predetermined value ba3. The predetermined value ba3 is a value larger than the predetermined value ba1 and is smaller than the predetermined value ba2. For example, in the region in which Bpa is larger than ba1 and is smaller than ba3, Ka1 is computed to a value larger than zero at the time when Bpa is increased, and Ka1 is computed to zero at the time when Bpa is reduced.

Similarly, in the second contribution degree computing block KE2, the computing characteristic CHke in the case where Bpa increases and the computing characteristic CHkf in the case where Bpa reduces are separately set, and CHkf is set so as to have a relatively larger characteristic than CHke. In CHke, Ke2 is set to one when Bpa is larger than or equal to zero and is smaller than the predetermined value be1, Ke2 is monotonously reduced with an increase in Bpa when Bpa is larger than or equal to the predetermined value be1 and is smaller than the predetermined value be2 (a value larger than be1), and Ke2 is set to zero when Bpa is larger than or equal to the predetermined value be2. In CHkf, Ke2 is set to zero when Bpa is larger than or equal to the predetermined value be2, Ke2 is set so as to monotonously increase with a reduction in Bpa when Bpa is larger than or equal to the predetermined value be3 and is smaller than the predetermined value be2, and Ke2 is set to one when Bpa is larger than or equal to zero and is smaller than a predetermined value be3. The predetermined value be3 is a value larger than the predetermined value be1 and smaller than the predetermined value be2. For example, in the region in which Bpa is larger than be1 and is smaller than be3, Ke2 is computed to a value smaller than one at the time when Bpa is increased, and Ke2 is computed to one at the time when Bpa is reduced.

The first and second contribution degree computing blocks KA1, KE2 respectively set the predetermined values ba3, be3 to values larger than a value fbm corresponding to the friction loss of the electric motor, and the like. The predetermined values ba1, be1 may be respectively set to values smaller than the value fbm. Because the values ba3, be3 are set to values larger than the friction loss corresponding value fbm, Fba is not used in computing Fbx before Bpa reaches fbm when Bpa is reduced. Therefore, Fbx is computed on the basis of only Fbe. As a result, fluctuations in energization amount due to the ineffective displacement can be prevented. In addition, because no influence of the ineffective displacement arises when Bpa is increased, the values ba1, be1 can be set irrespective of the friction loss corresponding value fbm, so the resolution of the pressing force may be ensured in the region in which Bpa is small. The value fbm is computed as the same physical quantity as the pressing force; however, the value fbm is converted to the same physical quantity as a value corresponding to Bpa on the basis of the specifications (the reduction ratio, the lead, and the like) of the braking means, and ba3 and be3 are determined.

In addition, the value fbm corresponding to the friction loss of the electric motor may be computed on the basis of the characteristic (the relationship between Mkc and Fbc) in the case where the braking operation amount Bpa is reduced, and may be variable. The values ba3, be3 may be determined on the basis of the computed (learned) value fbm. Specifically, when the braking operation amount Bpa is reduced, time-series data of the electric motor position Mkc and actual pressing force value Fbc are stored. On the basis of the stored time-series data, a region in which Fbc does not change (reduce) although Mkc changes (reduces) is extracted, and the value fbm is computed on the basis of Fbc in this region. The values ba3, be3 may be computed by adding a predetermined value fbo (a positive value) to the value fbm. The friction loss of the electric motor, and the like, fluctuates with aged deterioration; however, the value fbm corresponding to the friction loss is learned at the time when the driver carries out braking operation, appropriate pressing force feedback control may be executed.

In the computing characteristics CHka, CHkb, CHke, CHkf of the first and second contribution degrees Ka1, Ke2, instead of the braking operation amount Bpa (X-axis variable), at least one of the target pressing force Fbt, the actual pressing force value Fbc and the actual position Mkc (that is, a value corresponding to the braking operation amount) is used. This is because Fbt is computed on the basis of Bpa and the control results are Fbc and Mkc. The predetermined value be3 may be set so as to be equal to the predetermined value ba3.

In the computing characteristics CHka, CHkb, CHke, CHkf, the predetermined values ba1, be1 may be set so as to be equal to each other, the predetermined values ba2, be2 may be set so as to be equal to each other, and the predetermined values ba3, be3 may be set so as to be equal to each other. In this case, any one of the first contribution degree computing block KA1 or the second contribution degree computing block KE2 may be omitted. When the first contribution degree computing block KA1 is omitted, the resultant pressing force Fbx is computed by using the second contribution degree Ke2 on the basis of Fbx=(1−Ke2)×Fbc+Ke2×Fbe. When the second contribution degree computing block KE2 is omitted, the resultant pressing force Fbx is computed by using the first contribution degree Ka1 on the basis of Fbx=Ka1×Fbc+(1−Ka1)×Fbe. The estimated pressing force value Fbe is computed on the basis of the stiffness value Gcp and the electric motor position Mkc (that is, Fbe=Gcp×Mkc).

In the first contribution degree computing block KA1, the second contribution degree computing block KE2 and the second stiffness value computing block GCP, instead of the braking operation amount Bpa, at least one of the target pressing force Fbt, the actual pressing force value Fbc and the actual position Mkc may be used as a value corresponding to the braking operation amount.

<Second Stiffness Characteristic Computing Block CHGC>

Figure 5:
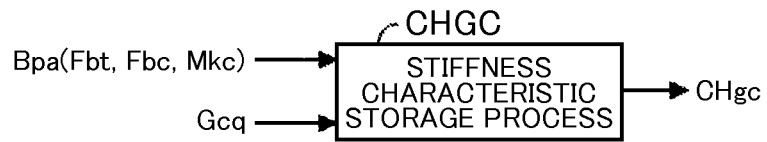
FIG. 5 is a functional block diagram for illustrating a stiffness characteristic computing block shown in FIG. 4.

The second stiffness value computing block GCP includes a stiffness characteristic storage processing block CHGC, and a stiffness computing characteristic CHgc may be learned in the stiffness characteristic storage processing block CHGC. FIG. 5 is a functional block diagram of the stiffness characteristic storage processing block CHGC. The stiffness computing characteristic CHgc is a computing map for computing (estimating) the second stiffness value Gcp on the basis of the electric motor position Mkc (see FIG. 4).

In the stiffness characteristic storage processing block CHGC, the characteristic of Gcq to Bpa is continuously stored on the basis of the braking operation amount Bpa and the first stiffness value (actual value) Gcq that is computed in the first stiffness value computing block GCQ. That is, the first stiffness value Gcq is sequentially stored in association with the braking operation amount Bpa, and the stored characteristic is output as the stiffness computing characteristic CHgc. The second stiffness value (estimated value) Gcp is computed on the basis of CHgc. In other words, the actual stiffness value (actual stiffness value) Gcq is stored to form the characteristic CHgc, and the stiffness value Gcp is estimated on the basis of CHgc.

In the stiffness characteristic storage processing block CHGC, the stiffness computing characteristic CHgc may be learned (stored) each time the driver carries out braking operation. At this time, when the temporal variation dBpa in the braking operation amount Bpa is larger than or equal to a predetermined value dbpx, the characteristic CHgc is not stored, and CHgc may be learned when dBpa is lower than the predetermined value dbpx. This is because, during rapid braking (when dBpa is large), a phase difference between Bpa and each of Mka (Mkc) and Fba (Fbc) (that is, a temporal delay in computed result Gcq from Bpa) becomes excessive. CHgc in the case where the electric motor position (rotation angle) Mka increases (when the MTR rotates in the forward direction) may not be employed, and CHgc in the case where Mka reduces (when the MTR rotates in the reverse direction) may be employed. At this time, a limit may be set on a temporal variation in Mka (that is, the speed of the electric motor), and the MTR may be gently rotated in the reverse direction. Thus, the influence of the above-described phase difference may be compensated.

In the KA1, KE2 and GCP of the resultant pressing force computing block, instead of the braking operation amount Bpa, at least one of the target pressing force Fbt, the actual pressing force value Fbc and the position Mkc (that is, a value corresponding to the braking operation amount) is used. In this case, the relationship of the second stiffness value Gcq with respect to at least one of the employed Fbt, Fbc and Mkc is stored as the stiffness computing characteristic CHgc. When at least one of Fbc and Mkc is employed, the influence of the above-described phase difference may not arise.

In the stiffness value computing block GCP, the value fbm corresponding to the above-described torque loss of the electric motor, and the like, may be computed. When the braking operation amount Bpa is reduced, the second stiffness value Gcq is computed on the basis of the position variation Mkh and the pressing force variation Fbh, and, after Gcq reduces to substantially zero, the value fbm may be computed on the basis of the actual pressing force value Fbc at the time when Gcq increases again. Specifically, after Gcq reduces and becomes lower than a predetermined value gcqy, the value fbm is determined on the basis of the actual pressing force value at time at which Gcq becomes higher than or equal to a predetermined value gcqz (a value higher than gcqy). At this time, the value fbm is computed to the same physical quantity as the pressing force; however, the value fbm is converted to the same physical quantity as a value corresponding to Bpa on the basis of the specifications (the reduction ratio, the lead, and the like) of the braking means.

<Standby Position Control Block ICT>

Figure 6:
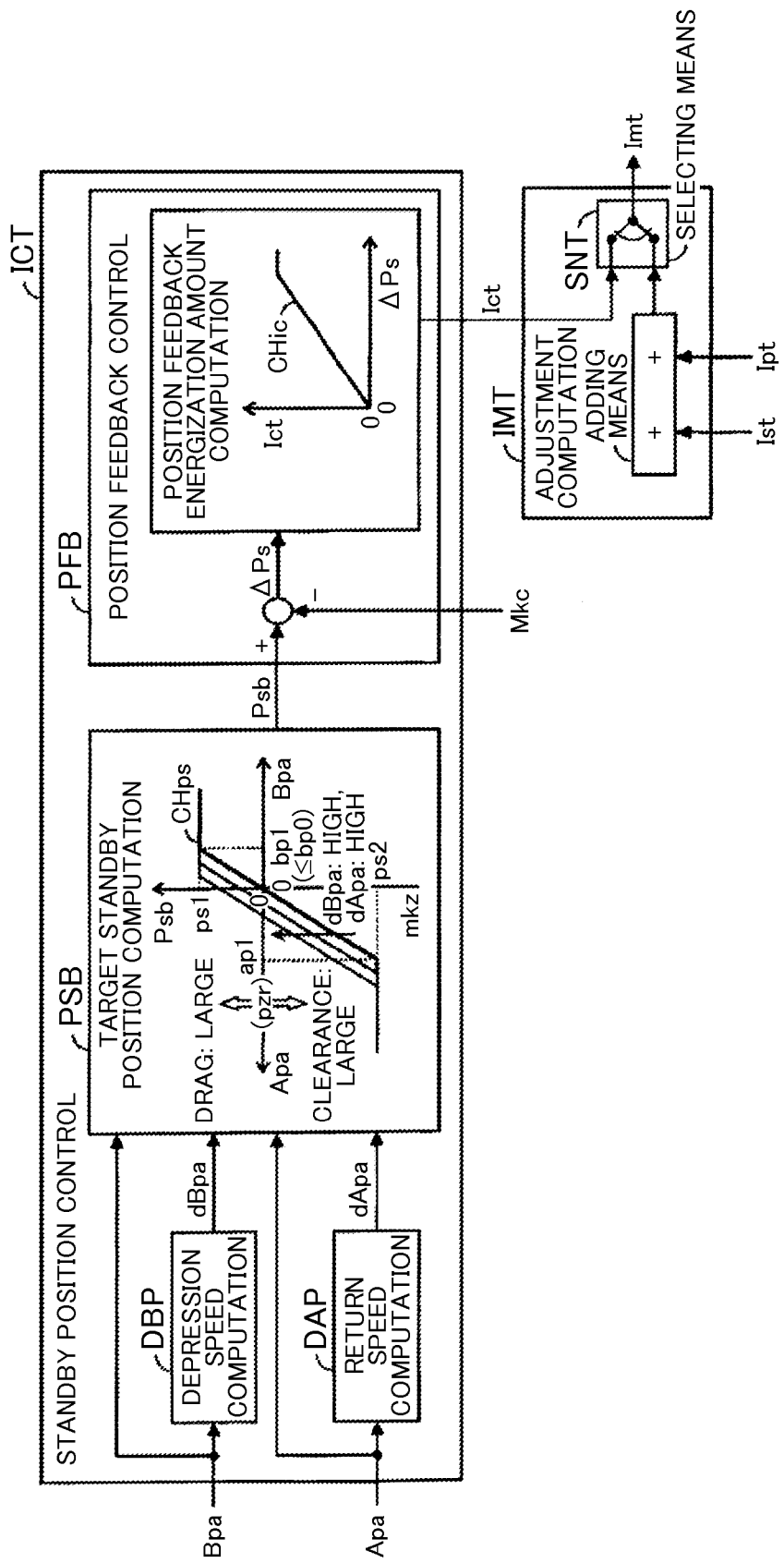
FIG. 6 is a functional block diagram for illustrating a standby position control block shown in FIG. 1.

Next, an embodiment of the standby position control block ICT (see FIG. 1) will be described with reference to FIG. 6.

In the standby position control block ICT, standby position control over the pressing member PSN is executed when the braking operation member BP is not operated by the driver or slightly operated by the driver (braking torque is not so generated as to decelerate the vehicle). In order not to reflect a driver's unconscious or unexpected motion to an actual behavior, a range (clearances) that is not reflected to the motion (that is, vehicle deceleration) within an operable range is set as a play of the BP. That is, in the standby position control, the position of the pressing member PSN (that is, the position of the MTR) is controlled when the driver is carrying out accelerating operation or when the driver is operating the BP within the range of the play of the braking operation member BP. Owing to the standby position control, the clearances between the friction members MSB and the rotary member KTB are controlled, and a drag state of the friction members MSB is adjusted.

The standby position control block ICT is composed of a depression speed computing block DBP, a return speed computing block DAP, a target standby position computing block PSB and a position feedback control block PFB. The ICT computes a target energization amount Ict of the standby position control on the basis of the braking operation amount Bpa, the accelerating operation amount Apa and the electric motor position Mkc.

In the depression speed computing block DBP, the depression speed dBpa of the BP is computed on the basis of the operation amount Bpa of the braking operation member (brake pedal) BP. Specifically, the depression speed dBpa may be computed by temporally differentiating the braking operation amount Bpa. When Bpa increases, dBpa is positive (+). As the BP is more rapidly depressed, dBpa becomes a higher value.

In the return speed computing block DAP, the return speed dApa of the AP is computed on the basis of the operation amount Apa of the accelerating operation member (accelerator pedal) AP. Specifically, the return speed dApa may be computed by temporally differentiating the accelerating operation amount Apa. When Apa reduces, dApa is positive (+). As the AP is more rapidly returned (released), dApa becomes a higher value.

In the target standby position computing block PSB, a target standby position Psb is computed on the basis of at least one of the braking operation amount Bpa, the depression speed (a temporal variation at the time when Bpa increases) dBpa, the accelerating operation amount Apa and the return speed (a temporal variation at the time when Apa reduces) dApa. The target standby position Psb corresponds to the position of the pressing member PSN in the case where braking operation is not carried out by the driver or slightly carried out by the driver. The slight braking operation corresponds to a state where, although the driver is placing the foot on the BP, the driver is operating the BP within the range of the play and is not expecting generation of the braking torque (that is, deceleration of the vehicle).

The target standby position Psb is computed on the basis of a computing characteristic (computing map) CHps and the braking operation amount Bpa. When Bpa is zero (that is, Bpa is not operated), Psb is computed to zero (that is, the reference position pzr). With an increase in Bpa, the target standby position Psb is computed so as to increase (that is, the PSN approaches the KTB). When Bpa is larger than or equal to the predetermined value bp1, the target standby position Psb may be limited to the predetermined value ps1. The predetermined operation amount bp1 is a value smaller than or equal to the predetermined operation amount bp0 (a value corresponding to the play of the BP) in the target pressing force computing block FBT (see FIG. 1). Therefore, the predetermined value ps1 corresponds to a state where the MSBs and the KTB slightly contact with each other (that is, a state where there is a drag of the MSBs with the KTB). The value bp1 may be set so as to be equal to the value bp0 corresponding to the play of the BP.

As the depression speed dBpa of the braking operation member BP increases, the target standby position Psb may be computed to a larger value. When dBpa in an initial stage of braking is large, the driver is requiring a rapid deceleration of the vehicle. In order to improve the responsiveness of the braking torque, Psb is computed to a larger value with an increase in dBpa, and the MSBs and the KTB may be placed in contact with each other in advance even when Bpa is substantially zero.

The target standby position Psb may be computed in consideration of the accelerating operation amount Apa. When Apa is large (which is indicated by an increase in the absolute value toward the minus side of the X-axis in the computing map CHps), Psb is computed to a side smaller than the reference position pzr (which is the PSN receding direction, and is a side away from the KTB). When the driver is operating the accelerating operation member AP, the target standby position Psb is computed to a smaller value to avoid a contact (that is, a drag) of the MSBs with the KTB, so the fuel economy of the vehicle can be improved. As the return speed dApa of the accelerating operation member AP increases, the probability that rapid braking will be carried out thereafter is high. Therefore, for the purpose of ensuring the responsiveness of the braking torque, the target standby position Psb may be computed to a larger value (which is the PSN advancing direction, and is a value in the direction approaching the KTB).

In the standby position feedback control block PFB, a standby position of the pressing member PSN is subjected to feedback control on the basis of the target standby position Psb and the actual position Mkc. That is, a position feedback energization amount Ict is computed on the basis of a deviation ΔPs between the target standby position Psb and the actual position Mkc. Ict is a target energization amount to the electric motor MTR for moving the pressing member PSN to the target standby position Psb.

In the standby position feedback control block PFB, initially, the deviation ΔPs (=Psb−Mkc) between the target standby position Psb and the actual position Mkc is computed. The standby position feedback energization amount Ict is computed on the basis of the position deviation ΔPs and a computing characteristic (computing map) CHic. The computing map CHic is set such that Ict increases as ΔPs increases.

The position feedback energization amount Ict is transmitted to the adjustment computing block IMT, and is adjusted with other energization target values (Ist, and the like). The selection computing block SNT is included in the adjustment computing block IMT, and a switch between the energization target value (the sum of Ist and Ipt) based on the pressing force and the energization target value (Ict) based on the position of the PSN is carried out. In other words, from the standby position Psb, at which the pressing force may not be substantially generated, to the reference position pzr, position control over the pressing member (piston) PSN is executed, and, when the PSN is advanced from the reference position pzr and the pressing force is actually generated, control is switched to pressing force control.

Assuming a situation that the driver carries out braking operation in a state where the PSN is kept at a position at which the MSBs may not contact with the KTR while not braking in order to avoid a drag of the MSBs. If the pressing force control is executed without executing the standby position feedback control, the pressing force may not be generated from the standby position Psb to the reference position pzr, so the pressing force deviation ΔFb (=Fbt−Fbx) increases in the pressing force feedback control block IPT, and the electric motor MTR is rapidly accelerated. Because the MSBs begin to contact with the KTB in the accelerating state, the pressing force is rapidly increased, and an overshoot of the pressing force may occur. In addition, originally unnecessary energization may be carried out because of the deviation ΔFb. On the other hand, when the standby position feedback control is executed as a stage prior to the pressing force feedback control, the position of the PSN is properly controlled on the basis of positional information (for example, Mkc) from the standby position Psb to the reference position pzr. Therefore, the pressing force may be smoothly increased without an overshoot, so useless energization of the electric motor can be suppressed.

<Second Embodiment of Correction Computing Block HSI>

Figure 7:
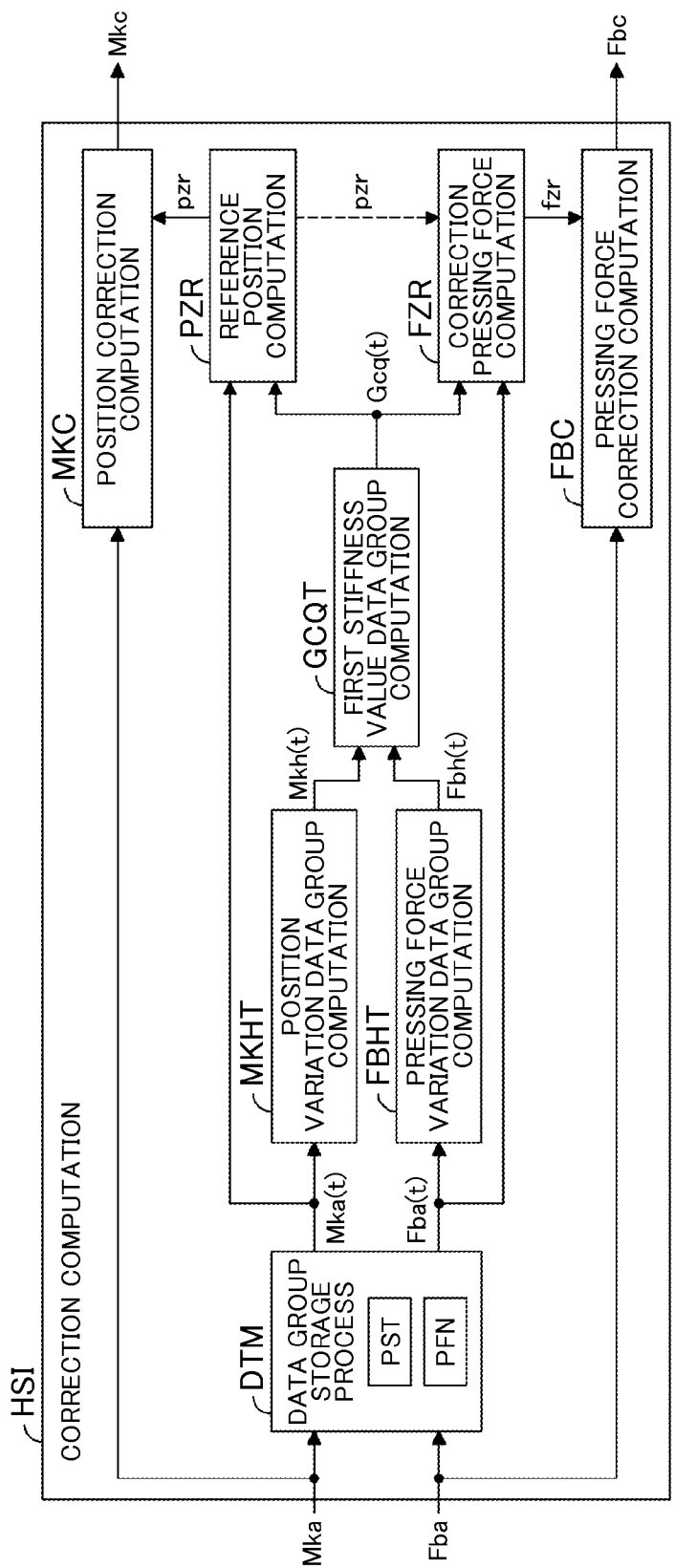
FIG. 7 is a functional block diagram for illustrating a second embodiment of a correction computing block.

Next, a second embodiment of the correction computing block HSI will be described with reference to the functional block diagram of FIG. 7.

In the correction computing block HSI, the zero point of the position acquisition means MKA (for example, the rotation angle sensor) and the zero point of the pressing force acquisition means FBA (for example, the pressing force sensor) are corrected. The zero point of the position acquisition means MKA is a reference position at a boundary between the side in which the pressing force is generated between the MSBs and the KTB and the side in which the pressing force is not generated (that is, a boundary between the side in which the MSBs and the KTB contact with each other and the side in which the MSBs and the KTB do not contact with each other). The zero point of the pressing force acquisition means FBA is a value that indicates a state where no pressing force (force that the MSBs press the KTB) is actually generated. A deviation (drift, offset) from the zero point of the FBA is called zero-point drift.

The correction computing block HSI is composed of a data group storage processing block DTM, a position variation data group computing block MKHT, a pressing force variation data group computing block FBHT, a first stiffness value data group computing block GCQT, the reference position computing block PZR, the position correction computing block MKC, the correction pressing force computing block FZR and the pressing force correction computing block FBC.

The acquired result (actual position) Mka of the MKA and the acquired result (actual pressing force) Fba of the FBA are input to the data group storage processing block DTM, and a time-series data group Mka(t) of Mka and a time-series data group Fba(t) of Fba are stored in the data group storage processing block DTM. The data group Mka(t) of Mka and the data group Fba(t) of Fba are synchronized with each other. The data group storage processing block DTM includes a start position determination block PST that determines a start position pst of data group storage and an end position determination block PFN that determines an end position pfn of data group storage in the position of the electric motor.

The start position pst and end position pfn of data group storage will be described with reference to FIG. 8. The storage process for the data groups Mka(t), Fba(t) is executed when the electric motor MTR is rotated in the reverse direction and the pressing member PSN separates from the rotary member KTB (operates in the return direction). The section from the start position pst to the end position pfn is called storage section mrk. That is, one end point (the side close to the KTB) of the storage section mrk is the start position pst, and the other end point (the side away from the KTB) is the end position pfn. A base point is set such that the ineffective displacement section mkm and the zero point (the true value of the reference position) mk0 are reliably included in the storage section mrk, and mrk (that is, pst, pfn) is determined on the basis of the base point. At the time of determining mrk, a predetermined value is considered in order to compensate for the influence of an error.

The start position pst is determined on the basis of a previously set reference position pzr[k] (a point close to the true value mk0) (computed before the current braking operation). That is, a position closer to the KTB by a predetermined value hmk1 than the previous reference position pzr[k] may be determined as pst.

The start position pst may be determined on the basis of a position (base point) pmk within the ineffective displacement section mkm. The base point pmk may be determined on the basis of previous Mka(t) and previous Fba(t). For example, a section in which Mka changes but Fba does not change (that is, the ineffective displacement section mkm) is extracted on the basis of Mka(t) and Fba(t) stored in the last series of braking operation, and the position pmk may be determined on the basis of this section. A position closer to the KTB from the base point pmk within mkm by a predetermined value hmk3 is determined as pst. For example, the base point pmk may be set to a position (point A) mk1 at which mkm estimated from previous data begins.

In addition, the start position pst may be determined on the basis of a limit position mkz at which the PSN is most distant from the KTB within the movable range of the screw member NJB. The movable range of the NJB is geometrically determined on the basis of the specifications of the BRK, and the limit position mkz is also a preset position (for example, a position at which movement is limited by a stopper, or the like). A position closer to the KTB from mkz by a predetermined value hmk5 may be determined as the start position pst. At the limit position mkz, the pressing member PSN is most distant from the rotary member KTB.

As in the case of the method of determining the start position pst, the end position pfn is determined on the basis of the previous reference position pzr[k]. The end position pfn is determined as a position distant from pzr[k] by a predetermined value hmk2 away from the KTB. The end position pfn may be determined on the basis of the position (base point) pmk within the ineffective displacement section mkm. The end position pfn is determined as a position distant from the base point pmk within mkm by a predetermined value hmk4 away from the KTB. For example, the base point pmk may be determined as a position (point B) mk2 at which mkm estimated from previous data ends. In addition, the end position pfn may be determined as a position closer to the KTB from a limit position (base point) mkz by a predetermined value hmk6.

Because the ineffective displacement section mkm is determined on the basis of the friction loss of the electric motor MTR and the clearances in the power transmission members, the predetermined values hmk1 to hmk6 may be experimentally obtained from the result of an endurance test, or the like, and set in advance. The ineffective displacement section mkm and the zero point (true value) mk0 are roughly estimated on the basis of Mka(t) and Fba(t) stored at the time of previous braking operation, and the predetermined values hmk1 to hmk6 may be appropriately set so as to reliably include mkm and mk0.

In the data group storage processing block DTM, from time at which the electric motor position reaches the start position pst to time at which the electric motor position reaches the end position pfn, the actual position Mka and actual pressing force Fba of the electric motor are associated with each other once every computation period, and are sequentially stored as the data groups Mka(t), Fba(t).

Referring back to FIG. 7, the description of the second embodiment of the correction computing block HSI will be continued. In the position variation data group computing block MKHT, a data group Mkh(t) of position variations is computed on the basis of the data group (position data group) Mka(t) in which the actual position Mka of the electric motor is stored. Specifically, an actual position data mka[i] in a certain computation period and an actual position data mka[j] after a lapse of a predetermined computation period (predetermined time) th0 from the certain computation period are extracted from Mka(t), and a difference (mka[i]−mka[j]) therebetween is computed as the position variation Mkh. Mkh is associated with each computation period, and the position variation data group Mkh(t) is computed.

In the pressing force variation data group computing block FBHT, a data group Fbh(t) of pressing force variations is computed on the basis of the data group (pressing force data group) Fba(t) in which the actual pressing force Fba is stored. Specifically, as in the case of Mka(t), an actual pressing force data fba[i] in a certain computation period and an actual pressing force data fba[j] after a lapse of the predetermined computation period (predetermined time) th0 from the certain computation period are extracted, and a difference (fba[i]−fba[j]) therebetween is computed as the pressing force variation Fbh. Fbh is associated with each computation period, and the pressing force variation data group Fbh(t) is computed. Mka(t), Fba(t), Mkh(t) and Fbh(t) are synchronized with one another. For example, the position mka[i], the pressing force fba[i], the position variation mkh[i] and the pressing force variation fbh[i] are values in the same computation period.

In the first stiffness value data group computing block GCQT, a data group Gcq(t) of first stiffness values (which correspond to actual stiffness values) is computed on the basis of the position variation data group Mkh(t) and the pressing force variation data group Fbh(t). Specifically, in each synchronized computation period, the pressing force variation Fbh to the position variation Mkh is computed as the first stiffness value Gcq (=Fbh/Mkh). Because the stiffness value (actual value) Gcq is a value corresponding to the spring constant of series-connected springs of the caliper CPR and the friction members MSB, the first stiffness value Gcq is computed by dividing the pressing force variation (for example, a temporal variation in pressing force) Fbh by the position variation (for example, a temporal variation in position) Mkh. Gcq in each computation period is stored, and the first stiffness value data group Gcq(t) is formed.

In the reference position computing block PZR, the reference position pzr is determined on the basis of the position data group Mka(t) and the first stiffness value data group Gcq(t). Specifically, in the reference position computing block PZR, the time of a change from the state where Gcq is higher than or equal to gcqx (Gcq≥gcqx) to the state where Gcq is lower than gcqx (Gcq<gcqx) is extracted from the stiffness value data group Gcq(t). The actual position Mka corresponding to the extracted state change time is extracted from Mka(t). When there are the plurality of change points of Gcq, Mka closest to the end point pfn among them is employed as the reference position pzr.

In the position correction computing block MKC, Mka acquired by the MKA is corrected by the reference position pzr, and the corrected electric motor position (corrected position) Mkc is computed. Mka at time at which Mka is set for the reference position pzr is set as the zero point, and the corrected position Mkc is computed. In other words, at the corrected position Mkc, the reference position pzr that is a boundary between the side in which the pressing force is generated between the MSBs and the KTB and the side in which the pressing force is not generated is set for the zero-point position of the position acquisition means (rotation angle sensor) MKA.

In the correction pressing force computing block FZR, the correction pressing force fzr corresponding to the zero-point drift of Fba acquired by the FBA is computed on the basis of the first stiffness value data group Gcq(t) and the pressing force data group Fba(t). As in the case of the method of determining the reference position pzr, in the correction pressing force computing block FZR, the time of a change from the state where Gcq is higher than or equal to gcqx (Gcq≥gcqx) to the state where Gcq is lower than gcqx (Gcq<gcqx) is extracted from the stiffness value data group Gcq(t). The pressing force Fba corresponding to the extracted state change time is extracted from Fba(t). When there are the plurality of change points of Gcq, Fba closest to the end point pfn among them is employed as the correction pressing force fzr. That is, the correction pressing force fzr is the pressing force Fba at the reference position pzr.

In the pressing force correction computing block FBC, the actual pressing force Fba is corrected on the basis of the correction pressing force fzr, and the corrected pressing force (corrected pressing force) Fbc is computed. Because the correction pressing force fzr corresponds to the zero-point drift of the pressing force acquisition means FBA, an error is compensated by subtracting the correction pressing force fzr from the actual pressing force Fba, and the corrected pressing force Fbc is computed.

The reference position pzr is not immediately determined at time at which the stiffness value Gcq (which corresponds to the spring constant of the BRK) becomes lower than the predetermined value gcqx, the start position pst and the end position pfn of storage process are determined such that the ineffective displacement section mkm and the zero point (the true value of the reference position) mk0 may be reliably included, and Mka and Fba are stored as time-series data. A data group Gcq(t) of stiffness values is computed on the basis of the stored data groups Mka(t), Fba(t), and the reference position pzr and the correction pressing force fzr are determined in an ex-post manner. Therefore, even when there is an ineffective displacement due to the clearances in the power transmission members of the speed reducer, and the like, the reference position pzr can be accurately determined. Because the correction pressing force fzr is determined on the basis of the actual pressing force Fba corresponding to the reference position pzr, the zero-point drift of the FBA can be reliably compensated. In addition, because the stiffness value Gcq is computed as the ratio of the pressing force variation Fbh to the position variation Mkh, the influences of the acquisition means (sensors) (particularly, the zero-point drift of the FBA) can be compensated. The clearances in the power transmission members include, for example, the backlash of the gears, the clearances in the coupling, and the clearances in bearings. In addition, these clearances may be increased by aged abrasion. The above-described predetermined values hmk1 to hmk6 may be values (preset predetermined values) that take the clearances in the power transmission members, including aged abrasion, into consideration.

A phase difference may arise between the detected signals of Mka and Fba. Therefore, in the correction computing block HSI, a correction computing process may be executed only when the rate of change dMka in Mka (the speed of the electric motor) is lower than or equal to the predetermined rate (predetermined value) dmk1. That is, only when the operation speed dBpa of Bpa is gentle (lower than the predetermined value dbp1), the reference position pzr and the correction pressing force fzr may be determined.

When the electric motor MTR is rotated in the reverse direction and Fba is reduced, a speed limit (limit value dmk2) may be set for the MTR within a predetermined region close to the reference position pzr. Alternatively, the MTR may be returned toward the zero point at a preset constant rate dmk3. That is, even when Bpa is rapidly returned, the speed of the PSN may be limited as the PSN approaches the reference position pzr. As a result, the influence of the above-described phase difference can be compensated.

<Third Embodiment of Correction Computing Block HSI>

Figure 9:
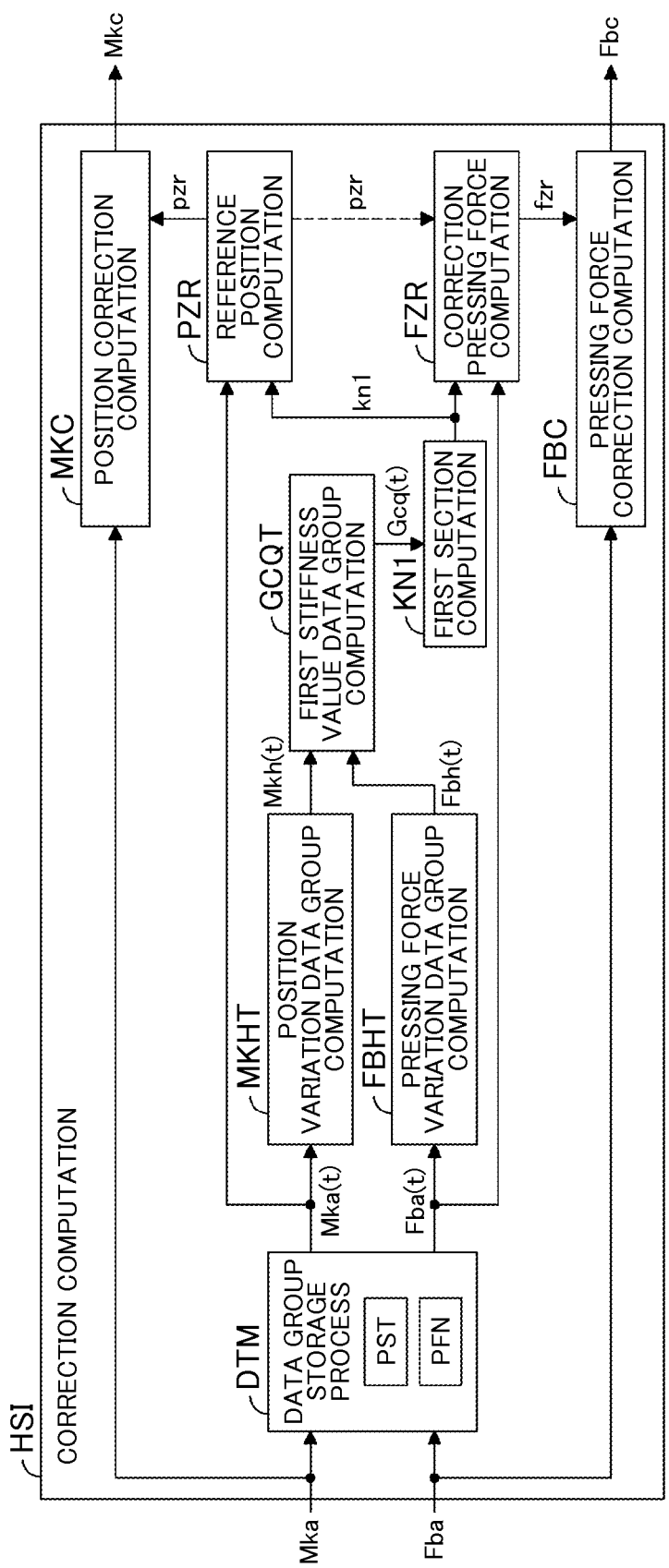
FIG. 9 is a functional block diagram for illustrating a third embodiment of a correction computing block.

Next, a third embodiment of the correction computing block HSI will be described with reference to the functional block diagram of FIG. 9. In the second embodiment, the reference position pzr is determined on the basis of the actual position Mka closest to the end position pfn among the actual positions Mka of the electric motor at the time of a change from the state where the stiffness value Gcq is higher than or equal to the predetermined ratio gcqx to the state where the stiffness value Gcq is lower than the predetermined ratio gcqx. On the other hand, in the third embodiment of the correction computing block HSI, a section (first section kn1) in which the state where Gcq falls within a first predetermined range (the range of a predetermined value −gcqx1 to a predetermined value gcqx2) is continued over a first predetermined value is extracted from the stiffness value data group Gcq(t). The reference position pzr is determined on the basis of the actual position Mka of the electric motor in the first section kn1. Specifically, a position closest to the start position pst within the first section kn1 may be determined as the reference position pzr.

In the third embodiment, the correction computing block HSI is composed of the data group storage processing block DTM, the position variation data group computing block MKHT, the pressing force variation data group computing block FBHT, the first stiffness value data group computing block GCQT, a first section computing block KN1, the reference position computing block PZR, the position correction computing block MKC, the correction pressing force computing block FZR and the pressing force correction computing block FBC. The computing blocks (DTM, and the like) other than the first section computing block KN1, the reference position computing block PZR and the correction pressing force computing block FZR are similar to those of the second embodiment, so the description is omitted.

In the first section computing block KN1, a section in which the state where the first stiffness value Gcq falls within the first predetermined range (−gcqx1≤Gcq<gcqx2) is continued over the first predetermined value hmx1 is extracted as the first section kn1 on the basis of the first stiffness value data group Gcq(t). That is, within the first section kn1, the condition that Gcq is higher than or equal to the predetermined value −gcqx1 and is lower than the predetermined value gcqx2 (gcqx1 and gcqx2 are positive predetermined values) is satisfied, and this state is continued over the predetermined displacement hmx1. The predetermined value hmx1 may be set to a value corresponding to the clearances in the power transmission members of the BRK (for example, the backlash of the gears, the clearances in the coupling, and the clearances in bearings). In addition, because these clearances are increased because of aged abrasion, the predetermined value hmx1 may be set to a value (preset predetermined value) that takes the clearances in the power transmission members, including aged abrasion, into consideration.

In the reference position computing block PZR, the reference position pzr is determined on the basis of the position data group Mka(t) and the first section kn1. Specifically, within the first section kn1, a position closest to the start position pst (that is, a position most distant from the end position pfn) may be determined as the reference position pzr.

In the correction pressing force computing block FZR, the correction pressing force fzr is determined on the basis of the pressing force data group Fba(t) and the first section kn1. Specifically, the pressing force Fba corresponding to a position closest to the start position pst (that is, a position most distant from the end position pfn) within the first section kn1 may be determined as the correction pressing force fzr. That is, as in the case of the second embodiment, the pressing force Fba corresponding to the reference position pzr is determined as the correction pressing force fzr.

The ineffective displacement mkm is due to the clearances in the power transmission members (the GSK, and the like), and the reference position pzr and the correction pressing force fzr are determined by extracting the first section kn1 in an ex-post manner in consideration of the clearances, so a similar advantageous effect to that of the second embodiment is obtained.

<Fourth Embodiment of Correction Computing Block HSI>

Figure 10:
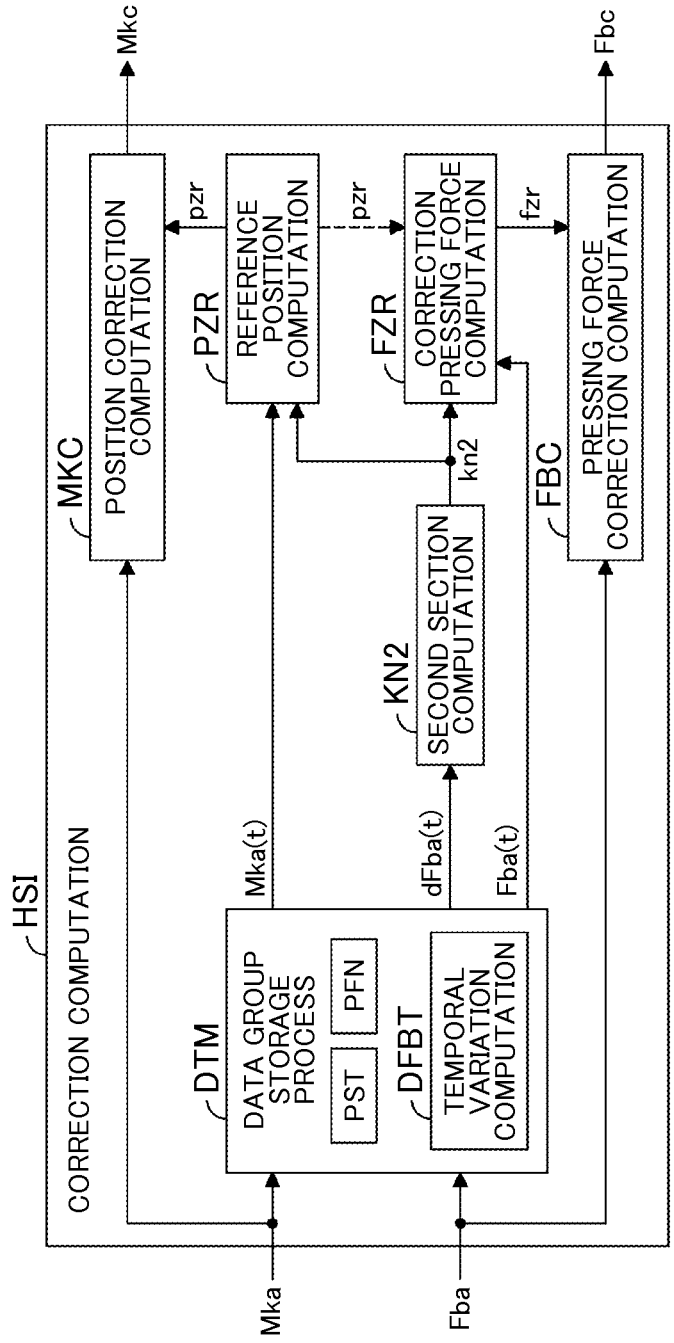
FIG. 10 is a functional block diagram for illustrating a fourth embodiment of a correction computing block.
Figure 14:
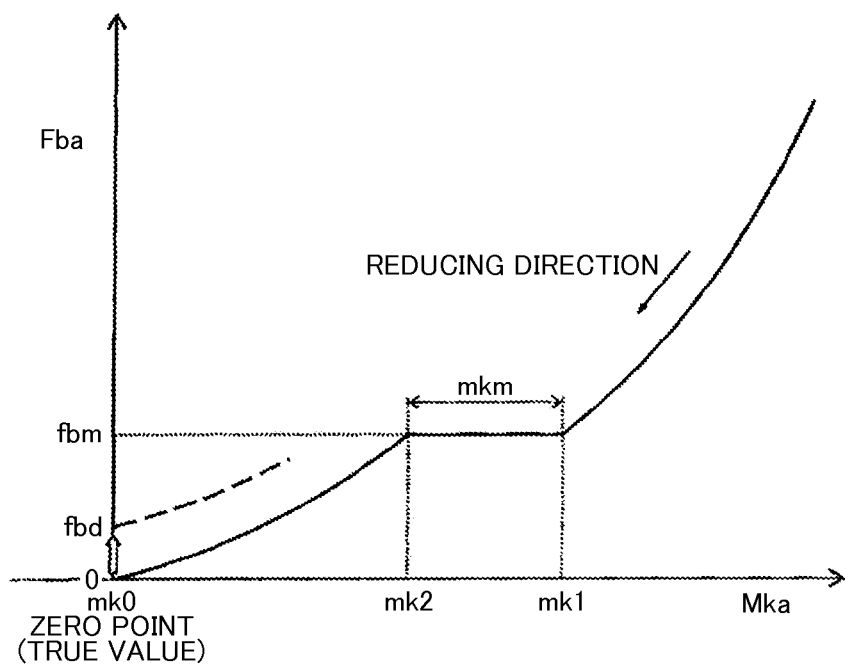
FIG. 14 is a view for illustrating an error in determining a reference position due to an ineffective displacement.

Next, a fourth embodiment of the correction computing block HSI will be described with reference to the functional block diagram of FIG. 10. In the third embodiment, the reference position pzr and the correction pressing force fzr are determined by extracting, from Gcq(t), a section in which the state where the stiffness value Gcq falls within the first predetermined range ($-gcqx1 \leq Gcq < gcqx2$) is continued over the first predetermined value hmx1 as the first section kn. In the fourth embodiment of the correction computing block HSI, a section (second section kn2) in which a state where dFba falls within a second predetermined range is continued over a second predetermined value is determined on the basis of the time-series data group dFba(t) of temporal variations dFba in pressing force, instead of Gcq(t). The reference position pzr is determined on the basis of the actual position Mka of the electric motor in the second section kn2. Specifically, within the second section kn2, a position closest to the start position pst may be determined as the reference position pzr.

In the fourth embodiment, the correction computing block HSI is composed of the data group storage processing block DTM, a second section computing block KN2, the reference position computing block PZR, the position correction computing block MKC, the correction pressing force computing block FZR and the pressing force correction computing block FBC. The computing blocks (the MKC, and the like) other than the data group storage processing block DTM and the second section computing block KN2 are similar to those of the third embodiment, so the description is omitted.

The acquired result (actual position) Mka of the MKA and the acquired result (actual pressing force) Fba of the FBA are input to the data group storage processing block DTM, and a time-series data group Mka(t) of Mka and a time-series data group Fba(t) of Fba are stored in the data group storage processing block DTM. The DTM includes a start position determination block PST that determines the start position pst of data group storage in the position of the electric motor and an end position determination block PFN that determines the end position pfn of data group storage in the position of the electric motor. The PST and the PFN are similar to those of the second embodiment.

In addition, the data group storage processing block DTM includes a temporal variation computing block DFBT for the pressing force. In the temporal variation computing block DFBT, the temporal variation dFba in pressing force Fba is computed on the basis of the pressing force data group Fba(t), and dFba is stored in time series. Specifically, Fba is temporally differentiated, synchronized with Mka, and the like, and the data group dFba(t) of pressing force temporal variations is formed.

In the second section computing block KN2, a section in which the state where dFba falls within the second predetermined range ($-dfbx1 \leq dFba < dfbx2$) is continued over the second predetermined value hmx2 is extracted as the second section kn2 on the basis of dFba(t). That is, within the second section kn2, the condition that dFba is higher than or equal to the predetermined value $-dfbx1$ and is lower than the predetermined value dfbx2 (dfbx1 and dfbx2 are positive predetermined values) is satisfied. As in the case of the third embodiment, this state is continued over the predetermined displacement hmx2. The predetermined value hmx2 may be set to a value corresponding to the clearances in the power transmission members of the BRK (for example, the backlash of the gears, the clearances in the coupling, and the clearances in bearings). In addition, because these clearances are increased because of aged abrasion, the predetermined value hmx2 may be set to a value (preset predetermined value) that takes the clearances in the power transmission members, including aged abrasion, into consideration.

At the time when the position of the electric motor MTR is returned near the reference position pzr, the electric motor MTR is rotated in the reverse direction at substantially a constant speed. Therefore, instead of the relationship between Gcq(t) and the first section kn1, the relationship between dFba(t) and the second section kn2 may be employed. In this case as well, a similar advantageous effect to that of the second embodiment is obtained.

<Operation and Advantageous Effect>

Next, a time-series behavior and operation and advantageous effect of the electric braking system according to the first embodiment of the invention of the present application will be described. FIG. 11 is a time-series chart in the case where the braking operation amount Bpa is reduced toward zero (a state where no braking operation is carried out) and a braking torque that is applied to each wheel WHL is reduced. The circle marks and the square marks indicate computed results in computation periods. The position mkz is called limit position, and is a position at which the pressing member PSN is most distant from the rotary member KTB within the movable range (for example, a range in which movement is limited by a stopper, or the like) of the screw member NJB.

At time t1, a switch of power transmitting faces (contact faces through which power is transmitted in the power transmission members) begins, and a state where a displacement of the electric motor occurs but the pressing force does not change (the state of the ineffective displacement) begins. The pressing force variation Fbh to the position variation (displacement) Mkh of the electric motor is computed as the first stiffness value Gcq; however, because the pressing force Fba does not change, Gcq is gradually computed to a lower value.

At time t2, the first stiffness value Gcq is still higher than or equal to the predetermined value (threshold) gcqx ($Gcq \geq gcqx$). At time t3, a change from the state where Gcq gcqx to the state where Gcq is lower than gcqx ($Gcq < gcqx$) occurs. The position Mka at this time (t3) (=mkat3, square mark) is stored as the candidate position Mkk, and, in addition, the pressing force Fba at t3 is stored as the candidate force Fkk (=fbat3, square mark). At time t3, counting the duration of the state where Gcq is lower than gcqx (Gcq<gcqx) is started.

At time t4, the power transmitting faces are completely switched, and the state of the ineffective displacement ends. At time t5, the state where Gcq is lower than gcqx is resolved. Because the state where Gcq<gcqx is not continued over the displacement (which corresponds to the clearance corresponding value) skh of the electric motor, which corresponds to the clearances in the power transmission members GSK, and the like (that is, because a displacement hmkt5 from t3 to t5 is shorter than skh), the candidate position Mkk (mkat3) and the candidate force Fkk (fbat3) are deleted (reset) at time t5 at which Gcq becomes higher than or equal to gcqx. The clearance corresponding value skh is a value corresponding to the clearances in the power transmission members (for example, the backlash of the gears, the clearances in the coupling, and the clearances in bearings). Because these clearances are increased because of aged abrasion, the clearance corresponding value skh may be set to a value (preset predetermined value) that takes the clearances in the power transmission members, including aged abrasion, into consideration.

At time t7, a change from the state where Gcq≥gcqx to the state where Gcq<gcqx occurs again. The position Mka at time t7 (=mkat7, square mark) and the pressing force Fba (=fbat7, square mark) are respectively stored as the candidate position Mkk and the candidate force Fkk. The duration of the state where Gcq<gcqx, that is, a displacement of the electric motor, begins to be accumulated (that is, a displacement of the electric motor begins to be measured). At time t8 at which a displacement hmkt8 from a position (candidate position) mkat7 at which Mkk is stored to mkat8 (a change in motor position from t7 to t8) exceeds the clearance corresponding value (the displacement corresponding to the clearances) skh, the candidate position Mkk (mkat7) is employed as the reference position pzr, and the candidate force Fkk (fbat7) is set for the correction pressing force fzr.

The actual position Mka of the electric motor, acquired by the MKA, is corrected by the reference position (which corresponds to a contact start position between the MSBs and the KTB) pzr, and the corrected position Mkc is computed. Similarly, the pressing force Fba acquired by the FBA is corrected by the correction pressing force (which corresponds to the zero-point drift of the FBA) fzr, and the corrected pressing force Fbc is computed. In this way, the reference position pzr and the correction pressing force fzr are not immediately determined at time at which the first stiffness value Gcq becomes lower than the predetermined threshold gcqx (for example, t3). The candidate position Mkk and the candidate force Fkk are stored at time at which Gcq<gcqx is satisfied, and, at time at which the state where Gcq<gcqx is satisfied has continued over the clearance corresponding value skh, the candidate position Mkk and the candidate force Fkk are formally employed retroactively as the reference position pzr and the correction pressing force fzr. Therefore, the influences of the above-described ineffective displacement and detection resolution are compensated, so acquired values can be accurately corrected.

When the electric motor MTR is rotated in the reverse direction and Fba is reduced, a speed limit may be set for the MTR within a predetermined region close to the reference position pzr. Alternatively, the MTR may be returned toward the zero point at a preset constant speed. That is, even when Bpa is rapidly returned, the speed of the PSN may be limited as the PSN approaches the reference position pzr. Therefore, the influence of a phase difference between Mka and Fba can be compensated.

There is a correlation between the displacement of the electric motor and a time. For example, when the speed of the electric motor is constant, a displacement is proportional to a time. Therefore, instead of the threshold skh for a displacement, a threshold skt for a time may be employed as the clearance corresponding value. That is, in the condition related to the clearance corresponding value, it is determined whether the state where Gcq<gcqx has continued over the time skt.

<Operation and Advantageous Effect>

Next, a time-series behavior and operation and advantageous effect according to the embodiment of the invention of the present application will be described with reference to the time-series charts of FIG. 12 and FIG. 13.

FIG. 12 illustrates the second embodiment, and is a time-series chart in the case where the braking operation amount Bpa is reduced toward zero (a state where no braking operation is carried out) and a braking torque that is applied to each wheel WHL is reduced. The circle marks and the square marks indicate computed results in computation periods. The position mkz is called limit position, and is a position at which the pressing member PSN is most distant from the rotary member KTB within the movable range (for example, a range in which movement is limited by a stopper, or the like) of the screw member NJB.

The base point pkm for determining the start position pst of the data storage process is set within the ineffective displacement section mkm on the basis of the relationship between previous Mka(t) and previous Fba(t). In addition, the previous reference position pzr[k] is set for the base point for determining the end position pfn of the data storage process. The start position pst is set to a position closer to the rotary member KTB from the base point pmk by the predetermined value hmk3. The end position pfn is set to a position distant from the base point pzr[k] by the predetermined value hmk2 away from the rotary member KTB. The storage process for the position data group Mka(t) and the pressing force data group Fba(t) is executed on the basis of the start position pst and the end position pfn.

At time u0, the actual position Mka of the electric motor reaches the start position pst, and the storage process is started. At time u8, the actual position Mka reaches the end position pfn, and the storage process is ended. Therefore, the time-series data groups Mka(t), Fba(t) are stored from time u0 to time u8. After time u8, the reference position pzr and the correction pressing force fzr are determined in an ex-post manner on the basis of the stored data groups.

The data groups Mkh(t), Fbh(t) of the respective variations are computed on the basis of Mka(t) and Fba(t). The pressing force variation data group Fbh(t) to the position variation data group Mkh(t) is computed as the stiffness value data group Gcq(t). The time of a change from the state where Gcq is higher than or equal to gcqx (Gcq≥gcqx) to the state where Gcq is lower than gcqx (Gcq<gcqx) (which is called state change time, and indicated by the square mark) is extracted from Gcq(t). Specifically, time u3 and time u7 apply to the condition and correspond to the state change time, actual displacements mkau3, mkau7 corresponding to these are extracted, and mkau7 closest to the end point pfn among the extracted actual positions mkau3, mkau7 is employed as the reference position pzr. In addition, the pressing force Fba (=fbau7) at time u7, corresponding to mkau7 employed as the reference position pzr, is determined as the correction pressing force fzr. That is, the pressing force Fba (fbau7) corresponding to the reference position pzr is employed as the correction pressing force fzr.

The actual position Mka of the electric motor, acquired by the position acquisition means MKA, is corrected by the reference position pzr, and the corrected position Mkc is computed. Similarly, the pressing force Fba acquired by the pressing force acquisition means FBA is corrected by the correction pressing force fzr, and the corrected pressing force Fbc is computed.

The first stiffness value Gcq is computed in real time, and the reference position (which corresponds to the contact start position between the MSBs and the KTB) pzr and the correction pressing force (which corresponds to the zero-point drift of the FBA) fzr are not immediately determined at the time when the first stiffness value Gcq becomes lower than the predetermined threshold gcqx. The storage section mrk for storing data (that is, the section from the start position pst to the end position pfn in the storage process) is set so as to include the section of the ineffective displacement mkm and the zero point (the true value of the reference position). In the storage section (from pst to pfn), Mka and Fba are stored as time-series data groups Mka(t), Fba(t) once every computation period. The reference position pzr and the correction pressing force fzr are determined by the ex-post computing process. Therefore, the influences of the above-described ineffective displacement and detection resolution are compensated, so acquired value (Mka, Fba) can be accurately corrected.

When the electric motor MTR is rotated in the reverse direction and Fba is reduced, a speed limit may be set for the MTR within a predetermined region close to the reference position pzr. Alternatively, the MTR may be returned toward the zero point at a preset constant speed. That is, even when Bpa is rapidly returned, the speed of the PSN may be limited as the PSN approaches the reference position pzr. Therefore, the influence of a phase difference between Mka and Fba can be compensated.

Next, the operations and advantageous effects of the third and fourth embodiments will be described with reference to FIG. 13. In the second embodiment of the correction computing block HSI, the state change time of Gcq is extracted; whereas, in the third embodiment, instead of this, the section (first section kn1) in which Gcq is continuously substantially constant is extracted from Gcq(t), and the reference position pzr and the correction pressing force fzr are determined on the basis of the first section kn1. Because there is a correlation (a proportional relation in the case where the speed of the electric motor is constant) between a displacement of the electric motor and a time, the temporal variation dFba in pressing force may be employed in the fourth embodiment instead of Gcq in the third embodiment. FIG. 13 mainly shows the case of the third embodiment, and shows the case (dFba, kn2, and the like) of the fourth embodiment in parentheses.

As in the case of the second embodiment, FIG. 13 is a time-series chart in the case where the braking operation amount Bpa is reduced toward zero, and the circle marks and the square marks indicate computed results in computation periods. The limit position mkz is a position at which the pressing member PSN is most distant from the rotary member KTB within the movable range of the screw member NJB. With a similar method, the start position pst and the end position pfn are determined so as to include the section of the ineffective displacement mkm and the zero point (the true value of the reference position) (that is, a section from the actual position at time v0 to the actual position at time v9 is set for the storage section mrk). Data groups Mka(v0 to v9), Fba(v0 to v9) are stored on the basis of the positions pst, pfn. A stiffness value data group Gcq(v0 to v9) that includes the ratios of Fba variation data group Fbh(v0 to v9) to Mka variation data group Mkh(v0 to v9) is computed on the basis of Mka(v0 to v9) and Fba(v0 to v9).

The first section kn1 (from a position mkav7 to a position mkav8) in which the state where Gcq falls within the first predetermined range ($-gcqx1 \leq Gcq < gcqx2$, and gcqx1 and gcqx2 are positive predetermined values) is continued over the first predetermined value (displacement hmx1) is extracted (determined) on the basis of Gcp(v0 to v9). A position mkav7 (square mark) closest to the start position pst (that is, a position most distant from the end position pfn) may be determined as the reference position pzr within the first section kn1. A pressing force fbav7 (square mark) corresponding to the position mkav7 closest to the start position pst (that is, a position most distant from the end position pfn) within the first section kn1 is determined as the correction pressing force fzr. That is, the pressing force Fba corresponding to the reference position pzr is determined as the correction pressing force fzr.

In the fourth embodiment, instead of Gcq, the temporal variation dFba in Fba is employed. dFba(t) is computed by temporally differentiating Fba(t), the second section kn2 (a section from the position mkav7 to the position mkav8) in which the state where dFba falls within the second predetermined range ($-dfbx1 \leq dFba < dfbx2$, and dfbx1 and dfbx2 are positive predetermined values) is continued over the second predetermined value (displacement hmx2) is extracted (determined) on the basis of dFba(t). As in the case of the third embodiment, the position mkav7 (square mark) closest to the start position pst within the second section kn2 is determined as the reference position pzr, and the pressing force fbav7 (square mark) corresponding to mkav7 is determined as the correction pressing force fzr.

The predetermined value (the threshold for a displacement) hmx1 or hmx2 may be set to a value corresponding to the clearances in the power transmission members of the BRK (for example, the backlash of the gears, the clearances in the coupling, and the clearances in bearings). In addition, because these clearances are increased because of aged abrasion, the predetermined value hmx1 or hmx2 may be set to a value (preset predetermined value) that takes the clearances in the power transmission members, including aged abrasion, into consideration.

There is a correlation between a displacement and a time. For example, when the speed of the electric motor is constant, a displacement is proportional to a time. Therefore, instead of the displacement (threshold) hmx1 or hmx2, a threshold tx1 or tx2 for a time may be employed. That is, the section in which Gcq falls within the first predetermined range is continued over the first predetermined time tx1 is extracted as the first section kn1, and the section in which the state where dFba falls within the second predetermined range is continued over the second predetermined time tx2 is extracted as the second section kn2.

According to the third and fourth embodiments as well, similar operations and advantageous effects to those of the second embodiment are obtained.

<Summary of Embodiment According to Invention of Present Application>

Hereinafter, the embodiment according to the invention of the present application will be summarized.

The electric braking system for a vehicle according to the invention of the present application includes braking operation amount acquisition means (BPA) for acquiring a driver's braking operation amount (Bpa) of a braking operation member (BP) of the vehicle, braking means (BRK) for generating a braking torque in a wheel (WHL) of the vehicle by transmitting power of an electric motor (MTR) via a transmission member (GSK, and the like) to press a friction member (MSB) against a rotary member (KTB) fixed to the wheel (WHL), and control means (CTL) for computing a target energization amount (Imt) on the basis of the braking operation amount (Bpa) and controlling the electric motor (MTR) on the basis of the target energization amount (Imt).

In addition, pressing force acquisition means (FBA) for acquiring an actual pressing force (Fba) that is a force that the friction member (MSB) actually presses the rotary member (KTB) and position acquisition means (MKA) for acquiring an actual position (Mka) of the electric motor (MTR) are included. By the control means (CTL), when the braking operation amount (Bpa) is reduced, a stiffness value (Gcq) that is a ratio (Fbh/Mkh) of a variation (Fbh) in the actual pressing force (Fba) to a variation (Mkh) in the actual position (Mka) is sequentially computed; the actual position (Mka) at time (t3, t7) at which the stiffness value (Gcq) changes from a state higher than or equal to a predetermined value (gcqx) to a state lower than the predetermined value (gcqx) is stored as a candidate position (Mkk); when a duration of the state where the stiffness value (Gcq) is lower than the predetermined value (gcqx) is shorter than a clearance corresponding value (skh, skt) corresponding to a clearance in the transmission member (GSK, and the like) in a state where the candidate position (Mkk) is stored, the candidate position (Mkk) is deleted (reset); at time (t8) at which the duration of the state where the stiffness value (Gcq) is lower than the predetermined value (gcqx) exceeds the clearance corresponding value (skh, skt) in the state where the candidate position (Mkk) is stored, the candidate position (Mkk) is determined as a reference position (pzr) at which the friction member (MSB) and the rotary member (KTB) begin to contact with each other; and the target energization amount (Imt) is computed on the basis of the reference position (pzr). For example, the reference position pzr is set for the zero point in positional information of the electric motor MTR, and feedback control based on the position Mkc is executed.

The reference position pzr is not immediately determined at time at which the stiffness value Gcq (which corresponds to the spring constant of the BRK) becomes lower than the predetermined value gcqx, but the reference position pzr is not determined until this state (Gcq<gcqx) is continued over the clearance corresponding value. Therefore, even when there is an ineffective displacement due to the clearances in the transmission member, such as the speed reducer, the reference position (a boundary position between a side in which the MSBs press the KTR and a side in which the MSBs do not press the KTR) pzr can be accurately determined. Because the stiffness value Gcq is computed as the ratio of the pressing force variation Fbh to the position variation Mkh, the influences of errors (particularly, the zero-point drift of the FBA) of the acquisition means (sensors) can be compensated. The clearances in the power transmission member include, for example, the backlash of the gears, the clearances in the coupling, and the clearances in bearings. In addition, these clearances may be increased by aged abrasion. Therefore, the clearance corresponding value skh or skt may be a value (preset predetermined value) that takes the clearances in the power transmission member, including aged abrasion, into consideration.

Similarly, in the electric braking system for a vehicle according to the invention of the present application, by the control means (CTL), when the braking operation amount (Bpa) is reduced, a stiffness value (Gcq) that is a ratio (Fbh/Mkh) of a variation (Fbh) in the actual pressing force (Fba) to a variation (Mkh) in the actual position (Mka) is sequentially computed; the pressing force (Fba) at time (t3, t7) at which the stiffness value (Gcq) changes from a state higher than or equal to a predetermined value (gcqx) to a state lower than the predetermined value (gcqx) is stored as a candidate force (Fkk); when a duration of the state where the stiffness value (Gcq) is lower than the predetermined value (gcqx) is shorter than a clearance corresponding value (skh, skt) corresponding to a clearance in the power transmission member (GSK, and the like) in a state where the candidate force (Fkk) is stored, the candidate force (Fkk) is deleted (reset); at time (t8) at which the duration of the state where the stiffness value (Gcq) is lower than the predetermined value (gcqx) exceeds the clearance corresponding value (skh, skt) in the state where the candidate force (Fkk) is stored, the candidate force (Fkk) is determined as a correction pressing force (fzr) corresponding to a zero-point drift of the pressing force acquisition means (FBA); and the target energization amount (Imt) is computed on the basis of the correction pressing force (fzr). Specifically, the correction value fzr of the pressing force is subtracted from the acquired value Fba by the pressing force acquisition means FBA, and feedback control based on the pressing force is executed on the basis of the corrected pressing force Fbc.

A force is detected by measuring a strain of a strain element. In this detection of the strain, a drift of a detected value may cause a problem. As in the case of the electric motor position, the pressing force Fba (the candidate force Fkk that is a candidate for a correction amount) is stored, and, when the condition of the clearance corresponding value is satisfied, a correction amount (correction pressing force fzr) corresponding to the zero-point drift of the pressing force is determined. Therefore, the zero-point drift of the FBA can be reliably compensated. The reference position pzr and the correction pressing force fzr are computed values at the same time (computation period).

In the electric braking system for a vehicle according to the embodiment of the invention of the present application, the control means (CTL) may be configured to, when the braking operation amount (Bpa) is larger than a predetermined value (bp0) corresponding to a play (free movement) of the braking operation member (BP), execute pressing force feedback control (IPT) on the basis of a pressing force (Fbc) corrected from the actual pressing force (Fba) by the use of the correction pressing force (fzr), and, when the braking operation amount (Bpa) is smaller than the predetermined value (bp0), execute position feedback control (ICT) on the basis of a position (Mkc) corrected from the actual position (Mka) by the use of the reference position (pzr).

In the electric braking system for a vehicle according to the embodiment of the invention of the present application, accelerating operation amount acquisition means APA for acquiring a driver's accelerating operation amount Apa of an accelerating operation member AP of the vehicle may be included, and the control means (CTL) may be configured to execute the position feedback control (ICT) on the basis of the accelerating operation amount Apa.

In addition, in the electric braking system for a vehicle according to the embodiment of the invention of the present application, the pressing force acquisition means (FBA) may use a value based on a digital signal obtained by analog-to-digital converting an analog signal output from an element (strain gauge, or the like) that detects a force that the friction member (MSB) presses the rotary member (KTB) as an actual pressing force (Fba). The position acquisition means (MKA) may use a value based on a digital signal directly output from an element (Hall IC, resolver, encoder, or the like) that detects a position of the electric motor (MTR) as a position (Mka) of the electric motor (MTR).

As described above, according to the invention, because acquired results Mka, Fba of the MKA and FBA can be accurately corrected by the reference position pzr and the correction pressing force fzr, appropriate position feedback control and pressing force feedback control can be executed.

<Summary of Embodiment According to Invention of Present Application>

Hereinafter, the embodiment according to the invention of the present application will be summarized.

The electric braking system for a vehicle according to the invention of the present application includes braking operation amount acquisition means (BPA) for acquiring a driver's braking operation amount (Bpa) of a braking operation member (BP) of the vehicle, braking means (BRK) for generating a braking torque in a wheel (WHL) by transmitting power of an electric motor (MTR) via a transmission member (GSK, and the like) to press a friction member (MSB) against a rotary member (KTB) fixed to the wheel (WHL) of the vehicle, and control means (CTL) for computing a target energization amount (Imt) on the basis of the braking operation amount (Bpa) and controlling the electric motor (MTR) on the basis of the target energization amount (Imt). In addition, pressing force acquisition means (FBA) for acquiring an actual pressing force (Fba) that is a force that the friction member (MSB) actually presses the rotary member (KTB) and position acquisition means (MKA) for acquiring an actual position (Mka) of the electric motor (MTR) are included. When the braking operation amount (Bpa) is reduced, the control means (CTL) sequentially stores a position data group (Mka(t)) for the actual position (Mka) and a pressing force data group (Fba(t)) for the actual pressing force (Fba) while the actual position (Mka) is changing from a start position (pst) that is one of end points of a storage section (mrk), including an ineffective displacement section (mkm) in which the actual position (Mka) reduces but the actual pressing force (Fba) does not reduce, to an end position (pfn) that is the other one of the end points of the storage section (mrk); determines a reference position (pzr), at which the friction member (MSB) and the rotary member (KTB) begin to contact with each other, on the basis of the position data group (Mka(t)) and the pressing force data group (Fba(t)); and computes the target energization amount (Imt) on the basis of the reference position (pzr).

Alternatively, in the electric braking system for a vehicle according to the embodiment of the invention of the present application, a correction pressing force (fzr) corresponding to a zero-point drift of the pressing force acquisition means (FBA) is determined on the basis of the position data group (Mka(t)) and the pressing force data group (Fba(t)), and the target energization amount (Imt) is computed on the basis of the correction pressing force (fzr).

The start position (pst) and the end position (pfn) of the storage section (mrk) may be determined on the basis of a previously set reference position pzr[k] (computed before current braking operation).

In the electric braking system for a vehicle according to the embodiment of the invention of the present application, the control means (CTL) may be configured to compute a ratio (first stiffness value Gcq) of a variation (Fbh) in the actual pressing force (Fba) to a variation (Mkh) in the actual position (Mka) on the basis of the position data group (Mka(t)) and the pressing force data group (Fba(t)); and determine the reference position (pzr) on the basis of the actual position (mkau7) closest to the end position (pfn) among the actual positions (mkau3, mkau7) at time (u3, u7) of a change of the ratio (Gcq) from a state higher than or equal to a predetermined ratio (gcqx) to a state lower than the predetermined ratio (gcqx).

In the electric braking system for a vehicle according to the embodiment of the invention of the present application, the control means (CTL) may be configured to compute a ratio (Gcq) of a variation (Fbh) in the actual pressing force (Fba) to a variation (Mkh) in the actual position (Mka) on the basis of the position data group (Mka(t)) and the pressing force data group (Fba(t)); determine a first section (kn1) in which a state where the ratio (Gcq) falls within a first predetermined range (−gcqx1 to gcqx2) continues over a first predetermined value (tx1, hmx1); and determine the reference position (pzr) on the basis of the actual position (Mka) in the first section (kn1).

In the electric braking system for a vehicle according to the embodiment of the invention of the present application, the control means (CTL) may be configured to compute a data group (dFba(t)) of temporal variations (dFba) in the actual pressing force on the basis of the pressing force data group (Fba(t)); determine a second section (kn2) in which a state where the temporal variation (dFba) falls within a second predetermined range (−dfbx1 to dfbx2) continues over a second predetermined value (tx2, hmx2); and determine the reference position (pzr) on the basis of the actual position (Mka) in the second section (kn2).

In the electric braking system for a vehicle according to the embodiment of the invention of the present application, the control means (CTL) may be configured to determine the actual pressing force (Fba), corresponding to the reference position (pzr), as the correction pressing force (fzr).

In addition, in the electric braking system for a vehicle according to the embodiment of the invention of the present application, the pressing force acquisition means (FBA) may use a value based on a digital signal obtained by analog-to-digital converting an analog signal output from an element (strain gauge, or the like) that detects a force that the friction member (MSB) presses the rotary member (KTB) as an actual pressing force (Fba). The position acquisition means (MKA) may use a value based on a digital signal directly output from an element (Hall IC, resolver, encoder, or the like) that detects a position of the electric motor (MTR) as a position (Mka) of the electric motor (MTR).

As described above, according to the invention, the start position pst and the end position pfn are determined so as to include the ineffective displacement mkm and the zero point (the true value of the reference position) in the actual position (actual rotation angle) Mka of the electric motor MTR. From pst to pfn, time-series data groups Mka(t), Fba(t) are stored. The reference position pzr and the correction pressing force (the zero-point drift of the FBA) fzr are determined in an ex-post manner on the basis of Mka(t) and Fba(t). Therefore, the influences of errors due to the ineffective displacement can be suppressed.

DESCRIPTION OF REFERENCE NUMERALS

BPA: braking operation amount acquisition means, MSB: friction member, KTB: rotary member, MTR: electric motor, BRK: braking means, CTL: control means, FBA: pressing force acquisition means, MKA: position acquisition means, Fba: actual pressing force, Mka: actual position of the electric motor, mkm: ineffective displacement section, Gcq: stiffness value, Mkk: candidate position, pzr: reference position, Fkk: candidate force, fzr: correction pressing force, pst: start position, Mka(t): position data group, Fba(t): pressing force data group, Bpa: braking operation amount, Imt: target energization amount

The invention claimed is:

1. An electric braking system for a vehicle, including:
braking operation amount acquisition means for acquiring a driver's braking operation amount of a braking operation member of the vehicle;
braking means for generating a braking torque in a wheel of the vehicle by transmitting power of an electric motor via a transmission member to press a friction member against a rotary member fixed to the wheel; and
control means for computing a target energization amount on the basis of the braking operation amount and controlling the electric motor on the basis of the target energization amount,
the electric braking system comprising:
pressing force acquisition means for acquiring an actual pressing force that is a force that the friction member actually presses the rotary member; and
position acquisition means for acquiring an actual position of the electric motor, wherein
the control means is configured to,
when the braking operation amount is reduced,
sequentially compute a stiffness value that is a ratio of a variation in the actual pressing force to a variation in the actual position;
store, as a candidate position, the actual position at time at which the stiffness value changes from a state higher than or equal to a predetermined value to a state lower than the predetermined value;
when a duration of the state where the stiffness value is lower than the predetermined value is shorter than a clearance corresponding value corresponding to a clearance in the transmission member in a state where the candidate position is stored, delete the candidate position;
at time at which the duration of the state where the stiffness value is lower than the predetermined value exceeds the clearance corresponding value in the state where the candidate position is stored, determine the stored candidate position as a reference position at which the friction member and the rotary member begin to contact with each other; and
compute the target energization amount on the basis of the reference position.

2. An electric braking system for a vehicle, including:
braking operation amount acquisition means for acquiring a driver's braking operation amount of a braking operation member of the vehicle;
braking means for generating a braking torque in a wheel of the vehicle by transmitting power of an electric motor via a transmission member to press a friction member against a rotary member fixed to the wheel; and
control means for computing a target energization amount on the basis of the braking operation amount and controlling the electric motor on the basis of the target energization amount,
the electric braking system comprising:
pressing force acquisition means for acquiring an actual pressing force that is a force that the friction member actually presses the rotary member; and
position acquisition means for acquiring an actual position of the electric motor, wherein
the control means is configured to,
when the braking operation amount is reduced,
sequentially compute a stiffness value that is a ratio of a variation in the actual pressing force to a variation in the actual position;
store, as a candidate force, the actual pressing force at time at which the stiffness value changes from a state higher than or equal to a predetermined value to a state lower than the predetermined value;
when a duration of the state where the stiffness value is lower than the predetermined value is shorter than a clearance corresponding value corresponding to a clearance in the transmission member in a state where the candidate force is stored, delete the candidate force;
at time at which the duration of the state where the stiffness value is lower than the predetermined value exceeds the clearance corresponding value in the state where the candidate force is stored, determine the stored candidate force as a correction pressing force corresponding to a zero-point drift of the pressing force acquisition means; and
compute the target energization amount on the basis of the correction pressing force.

3. An electric braking system for a vehicle, including:
braking operation amount acquisition means for acquiring a driver's braking operation amount of a braking operation member of the vehicle;
braking means for generating a braking torque in a wheel of the vehicle by transmitting power of an electric motor via a transmission member to press a friction member against a rotary member fixed to the wheel; and
control means for computing a target energization amount on the basis of the braking operation amount and controlling the electric motor on the basis of the target energization amount,
the electric braking system comprising:
pressing force acquisition means for acquiring an actual pressing force that is a force that the friction member actually presses the rotary member; and
position acquisition means for acquiring an actual position of the electric motor, wherein
the control means is configured to,
when the braking operation amount is reduced,
sequentially store a position data group for the actual position and a pressing force data group for the actual pressing force while the actual position is changing from a start position that is one of end points of a storage section, including an ineffective displacement section in which the actual position reduces but the actual pressing force does not reduce, to an end position that is the other one of the end points of the storage section;
determine a reference position, at which the friction member and the rotary member begin to contact with each other, on the basis of the position data group and the pressing force data group; and
compute the target energization amount on the basis of the reference position.

4. An electric braking system for a vehicle, including:
braking operation amount acquisition means for acquiring a driver's braking operation amount of a braking operation member of the vehicle;
braking means for generating a braking torque in a wheel of the vehicle by transmitting power of an electric motor via a transmission member to press a friction member against a rotary member fixed to the wheel; and control means for computing a target energization amount on the basis of the braking operation amount and controlling the electric motor on the basis of the target energization amount, the electric braking system comprising:

pressing force acquisition means for acquiring an actual pressing force that is a force that the friction member actually presses the rotary member; and position acquisition means for acquiring an actual position of the electric motor, wherein the control means is configured to, when the braking operation amount is reduced, sequentially store a position data group for the actual position and a pressing force data group for the actual pressing force while the actual position is changing from a start position that is one of end points of a storage section, including an ineffective displacement section in which the actual position reduces but the actual pressing force does not reduce, to an end position that is the other one of the end points of the storage section;

determine a correction pressing force, corresponding to a zero-point drift of the pressing force acquisition means, on the basis of the position data group and the pressing force data group; and compute the target energization amount on the basis of the correction pressing force.

* * * * *